(12) United States Patent
Kusakari et al.

(10) Patent No.: US 9,094,793 B2
(45) Date of Patent: Jul. 28, 2015

(54) TRANSMISSION SYSTEM, LOCATION MANAGEMENT SYSTEM, AND METHOD OF TRANSMITTING LOCATION DATA

(71) Applicants: Shin Kusakari, Kanagawa (JP); Seiji Miyawaki, Kanagawa (JP); Michitaka Fukuda, Kanagawa (JP); Kunihiro Miyauchi, Kanagawa (JP); Satoshi Kawasaki, Kanagawa (JP); Yasuo Ohashi, Kanagawa (JP); Shinji Aoki, Kanagawa (JP); Takaaki Hiroi, Tokyo (JP); Yusuke Matsushita, Kanagawa (JP)

(72) Inventors: Shin Kusakari, Kanagawa (JP); Seiji Miyawaki, Kanagawa (JP); Michitaka Fukuda, Kanagawa (JP); Kunihiro Miyauchi, Kanagawa (JP); Satoshi Kawasaki, Kanagawa (JP); Yasuo Ohashi, Kanagawa (JP); Shinji Aoki, Kanagawa (JP); Takaaki Hiroi, Tokyo (JP); Yusuke Matsushita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 59 days.

(21) Appl. No.: 14/022,589

(22) Filed: Sep. 10, 2013

(65) Prior Publication Data
US 2014/0087766 A1 Mar. 27, 2014

(30) Foreign Application Priority Data
Sep. 21, 2012 (JP) ................. 2012-208654

(51) Int. Cl.
*H04W 4/02* (2009.01)
*H04W 4/04* (2009.01)
*G01S 19/10* (2010.01)
*H04W 4/00* (2009.01)
*H04L 29/08* (2006.01)

(52) U.S. Cl.
CPC ............... *H04W 4/023* (2013.01); *G01S 19/10* (2013.01); *H04W 4/043* (2013.01); *H04L 67/18* (2013.01); *H04W 4/008* (2013.01)

(58) Field of Classification Search
CPC ......... H04W 64/00; H04W 4/02; H04W 4/00; H04W 4/021; G01S 5/0252; G01S 5/0289; G01S 5/021; H04M 1/72572
USPC ............................................... 455/456.1–457
See application file for complete search history.

(56) References Cited

U.S. PATENT DOCUMENTS 8,892,118 B2 * 11/2014 Garin et al. ................. 455/456.1
2011/0029359 A1 * 2/2011 Roeding et al. .............. 705/14.1
2012/0021762 A1 * 1/2012 Garin et al. ................. 455/456.3

(Continued)

FOREIGN PATENT DOCUMENTS

JP 2005-158007 6/2005
JP 2011-078001 4/2011
JP 2012109903 A * 6/2012

OTHER PUBLICATIONS

U.S. Appl. No. 14/022,757, filed Sep. 10, 2013.
U.S. Appl. No. 14/022,659, filed Sep. 10, 2013.

(Continued)

*Primary Examiner* — Kashif Siddiqui
*Assistant Examiner* — Ather Mohiuddin
(74) *Attorney, Agent, or Firm* — Oblon, McClelland, Maier & Neustadt, L.L.P.

(57) ABSTRACT

A transmission system, a location management system, and a transmission method, each of which transmits first location data and second location data, respectively, from a first transmission device and a second transmission device, and receives, at the second transmission device, the first location data and terminal identification data that identifies a communication terminal, from the communication terminal that receives at least the first location data.

18 Claims, 22 Drawing Sheets

(56) References Cited

U.S. PATENT DOCUMENTS

2013/0234893 A1 9/2013 Kusakari et al.
2013/0243040 A1* 9/2013 Kimura .......................... 375/141

OTHER PUBLICATIONS

U.S. Appl. No. 14/022,874, filed Sep. 10, 2013.
U.S. Appl. No. 14/023,910, filed Sep. 11, 2013.
U.S. Appl. No. 13/795,383, filed Mar. 12, 2013.
U.S. Appl. No. 13/784,961, filed Mar. 5, 2013.
U.S. Appl. No. 13/919,232, filed Jun. 17, 2013.
U.S. Appl. No. 13/864,554, filed Apr. 17, 2013.
U.S. Appl. No. 13/923,596, filed Jun. 21, 2013.
U.S. Appl. No. 13/893,522, filed May 14, 2013.
U.S. Appl. No. 13/906,366, filed May 31, 2013.
U.S. Appl. No. 13/905,382, filed May 30, 2013.
U.S. Appl. No. 13/908,117, filed Jun. 3, 2013.
U.S. Appl. No. 13/906,370, filed May 31, 2013.
U.S. Appl. No. 13/905,683, filed May 30, 2013.

* cited by examiner

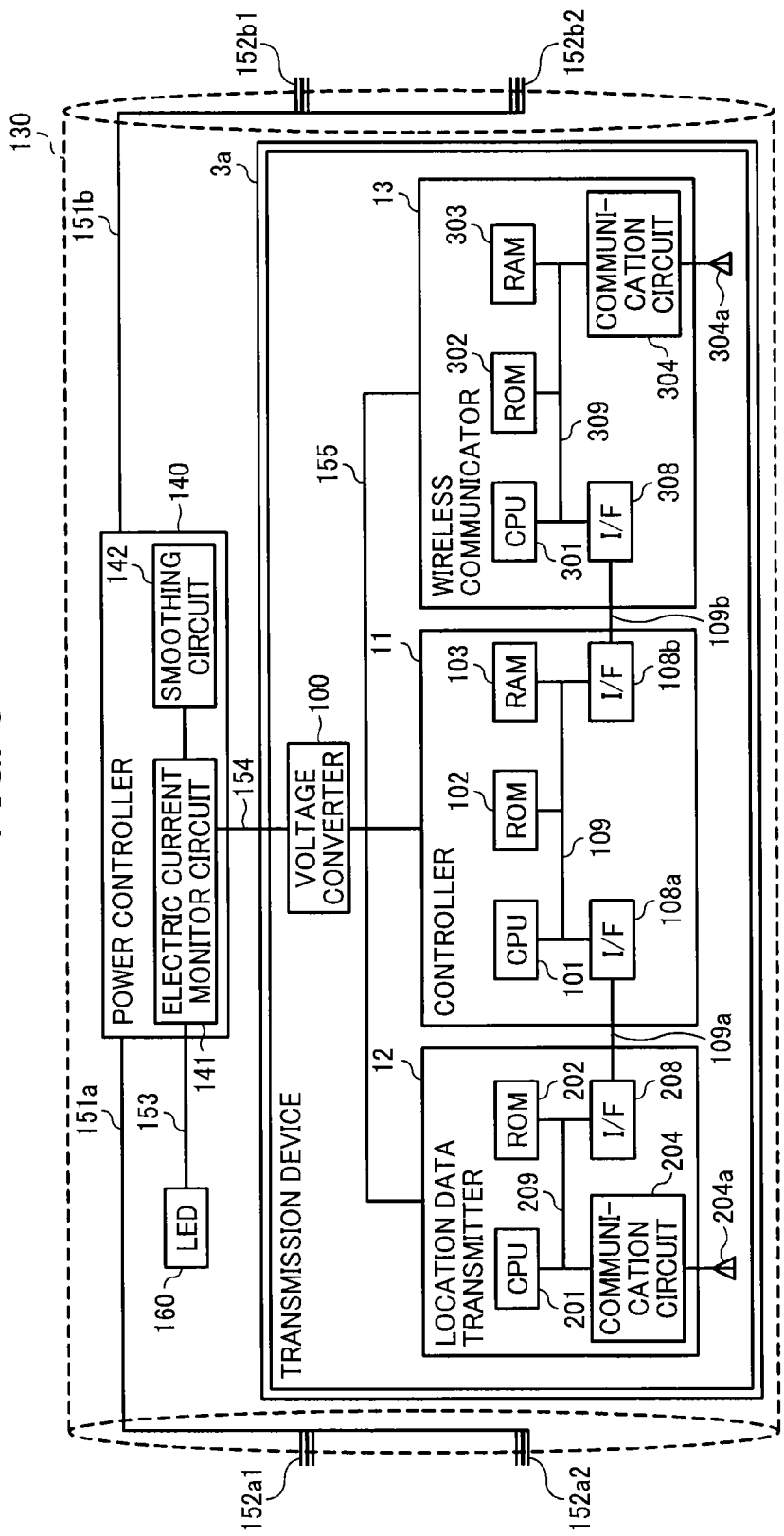

FIG. 13

| TERMINAL ID A | DEVICE NAME | OWNER (ADMINISTRATOR) | LATITUDE | LOCATION DATA X ||| RECEIVED DATE/TIME |
| | | | | LONGITUDE | FLOOR | BUILDING NUMBER | |
|---|---|---|---|---|---|---|---|
| 002673abcdef01 | PJ WX4310 | SALES 1 | 35.459555 | 139.387110 | 16 | C | 11/12/12 13:30:01 |
| 002673abcdef02 | UXS P3000 | SALES 2 | 35.459483 | 139.388437 | 4 | A | 11/12/12 13:30:03 |
| ... | ... | ... | ... | ... | ... | ... | ... |

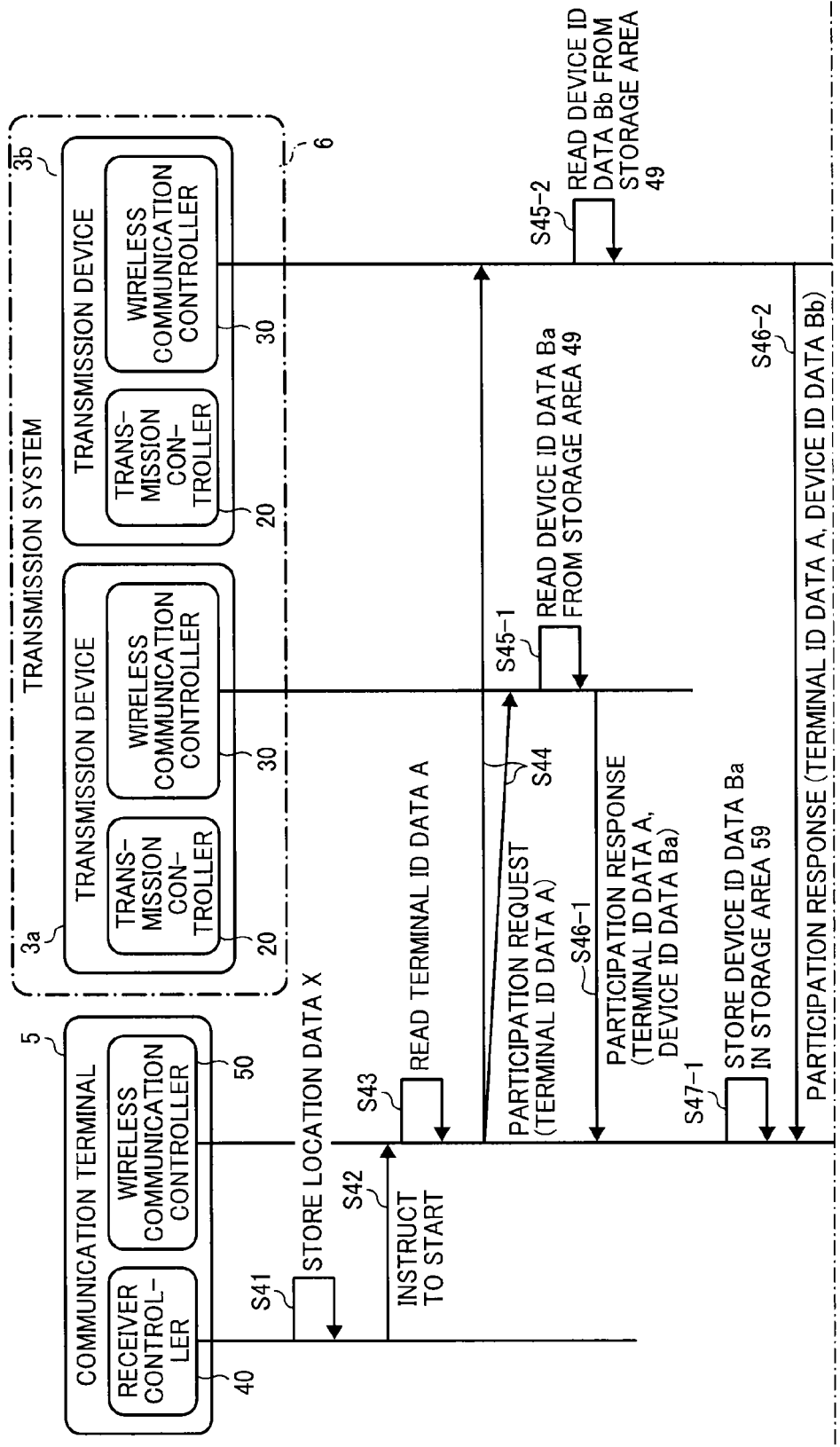

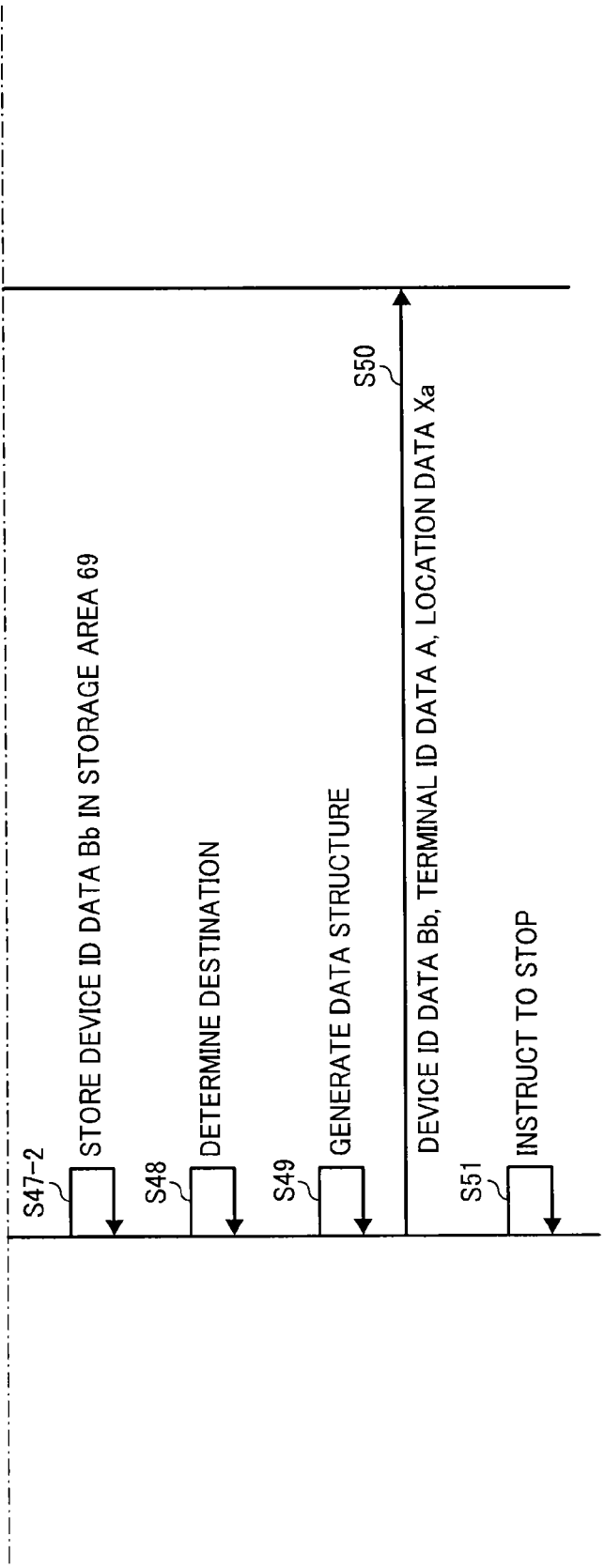

TRANSMISSION SYSTEM, LOCATION MANAGEMENT SYSTEM, AND METHOD OF TRANSMITTING LOCATION DATA

CROSS-REFERENCE TO RELATED APPLICATIONS

This patent application is based on and claims priority pursuant to 35 U.S.C. §119 to Japanese Patent Application No. 2012-208654, filed on Sep. 21, 2012, in the Japan Patent Office, the entire disclosure of which is hereby incorporated by reference herein.

BACKGROUND

1. Field of the Invention

The present invention generally relates to transmitting at least first location data and second location data, respectively, from a first transmission device and a second transmission device of a transmission system, and receiving the first location data at the second transmission device.

2. Description of the Related Art

The location of a user, such as the location of a communication terminal operated by the user, may be determined using a global positioning system (GPS). In the GPS, about 30 GPS satellites that orbit around the earth respectively transmit radio frequency (RF) signals each indicating the signal transmission time. Each of the GPS receivers such as various communication terminals on the earth, receives the signal from the corresponding GPS satellite, and calculates a distance between the communication terminal and the GPS satellite based on the difference between the signal transmission time and the signal reception time. Each communication terminal usually performs this calculation at least for four GPS satellites to determine the location of the communication terminal on the earth.

As the GPS receiver becomes smaller in size and more energy efficient, the use of GPS increases. For example, various communication terminals, such as portable phones, are usually provided with the GPS receivers. However, the communication terminal is not able to receive the RF signal from the GPS satellite, if it is located indoors. In view of this, the indoor messaging system (IMES), which provides indoor positioning, has been proposed to realize seamless positioning environment.

SUMMARY

A transmission system, a location management system, and a transmission method, each of which transmits first location data and second location data, respectively, from a first transmission device and a second transmission device, and receives, at the second transmission device, the first location data and terminal identification data that identifies a communication terminal, from the communication terminal that receives at least the first location data.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is a schematic block diagram illustrating a hardware structure of a LED lighting device functioning as the electrical device of FIG. 1, which includes a transmission device, according to an example embodiment of the present invention;

FIG. 6 is an example table storing location data, which may be transmitted from the transmission device of the electrical device of FIG. 1;

FIG. 13 is an example table storing data to be managed by the location data management system of FIG. 12;

FIGS. 19A and 19B are a data sequence diagram illustrating operation of determining location data used by the communication terminal and a destination transmission device to which the location data is transmitted, according to an example embodiment of the present invention;

Figure 1:
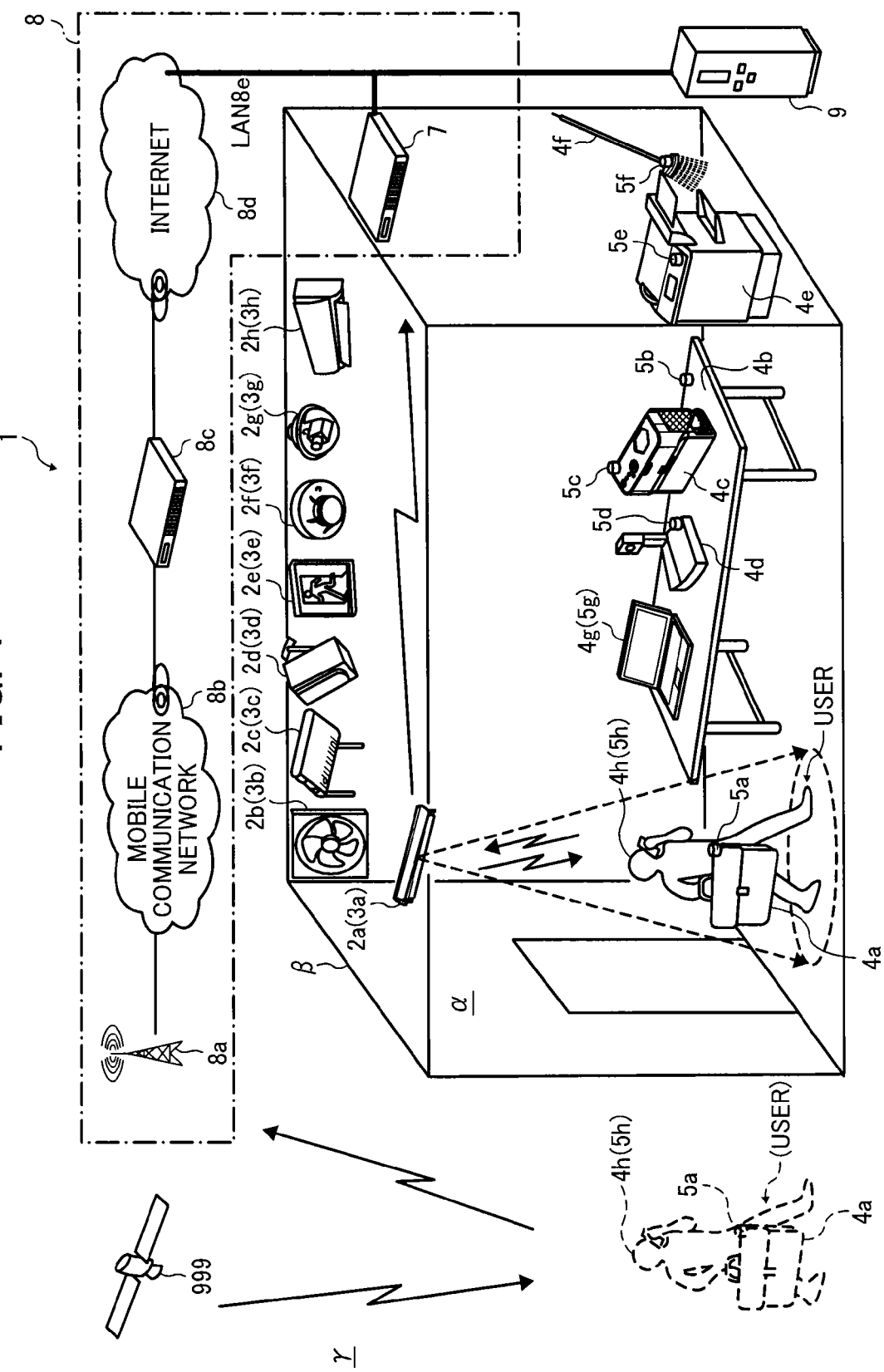
FIG. 1 is a configuration of a location management system including a plurality of electrical devices and at least one managed device, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to FIGS. 1 to 27, example embodiments of the present invention are explained. FIG. 1 illustrates a configuration of a location management system 1 according to an example embodiment of the present invention.

Referring to FIG. 1, the location management system 1 includes a plurality of transmission devices $3a, 3b, 3c, 3d, 3e, 3f, 3g$, and $3h$ located on or near a ceiling β inside a building ("indoors α"), a plurality of communication terminals $5a, 5b, 5c, 5d, 5e, 5f, 5g$, and $5h$ located inside the building such as on or near a floor, and a location data management system 9.

The transmission devices $3a, 3b, 3c, 3d, 3e, 3f, 3g$, and $3h$ are respectively stored with location data Xa, Xb, Xc, Xd, Xe, Xf, Xg, and Xh each indicating the location at which the transmission device 3 is located. For example, as described below referring to FIG. 8, the location data may be position data, which is used for indoor positioning. The transmission devices $3a, 3b, 3c, 3d, 3e, 3f, 3g$, and $3h$ respectively transmit the location data Xa, Xb, Xc, Xd, Xe, Xf, Xg, and Xh toward the floor in the building. The transmission devices $3a, 3b, 3c, 3d, 3e, 3f, 3g$, and $3h$ are respectively stored with device identification data ("device ID data") Ba, Bb, Bc, Bd, Be, Bf, Bg, and Bh each identifying the corresponding transmission device. In this example, the transmission devices $3a, 3b, 3c, 3d, 3e, 3f, 3g$, and $3h$ are respectively incorporated within or provided on the outer surfaces of the electrical devices $2a, 2b, 2c, 2d, 2e, 2f, 2g$, and $2h$ that are respectively fixed to the ceiling β.

The communication terminals $5a, 5b, 5c, 5d, 5e, 5f, 5g$, and $5h$ are respectively stored with terminal identification data ("terminal ID data") Aa, Ab, Ac, Ad, Ae, Af, Ag, and Ah each of which identifies the corresponding communication terminal.

For simplicity, the transmission devices $3a, 3b, 3c, 3d, 3e, 3f, 3g$, and $3h$ are arbitrarily or collectively referred to as the transmission device 3. The communication terminals $5a, 5b, 5c, 5d, 5e, 5f, 5g$, and $5h$ are arbitrarily or collectively referred to as the communication terminal 5. The location data Xa, Xb, Xc, Xd, Xe, Xf, Xg, and Xh are arbitrarily or collectively referred to as the location data X. The device ID data Ba, Bb, Bc, Bd, Be, Bf, Bg, and Bh are arbitrarily or collectively referred to as the device ID data B. One example of the device ID data B may be a media access control (MAC) address. The terminal ID data Aa, Ab, Ac, Ad, Ae, Af, Ag, and Ah are arbitrarily or collectively referred to as the terminal ID data A. One example of the terminal ID data A may be a MAC address. The electrical devices $2a, 2b, 2c, 2d, 2e, 2f, 2g$, and $2h$ are arbitrarily or collectively referred to as the electrical device 2.

The communication terminal 5, which receives the location data X from the transmission device 3, transmits the location data X and the terminal ID data A to the transmission device 3.

The electrical device 2 supplies electric power to the transmission device 3. In this example, the electrical device $2a$ is a lighting device with a fluorescent light emitting diode (LED). The electrical device $2b$ is a fan. The electrical device $2c$ is an access point for a wireless local area network (LAN). The electrical device 2d is a speaker. The electrical device 2e is an emergency lamp. The electrical device 2f is a fire or smoke detector. The electrical device 2g is a monitoring camera. The electrical device 2h is an air conditioner. As long as the electrical device 2 supplies electric power to the transmission device 3, any other desired electrical device may be provided with the transmission device 3. For example, the other type of lighting device such as a fluorescent lamp or an incandescent lamp may be used. In another example, a security sensor that detects human presence or activity may be used.

The communication terminals 5a, 5b, 5c, 5d, 5e and 5f are respectively attached to the outer surfaces of management target devices ("managed devices") 4a, 4b, 4c, 4d, 4e, and 4f. The managed device 4a is a bag. The managed device 4b is a table. The managed device 4c is a projector. The managed device 4d is a videoconference device. The managed device 4e is a multifunctional printer (MFP). The managed device 4f is a broom.

The managed device 4g is a personal computer having the function of the communication terminal 5g. The managed device 4h is a portable phone, such as a smart phone, having the function of the communication terminal 5h. In the following, the managed devices 4a, 4b, 4c, 4d, 4e, 4f, 4g, and 4h are arbitrarily or collectively referred to as the managed device 4.

In alternative to the managed device 4 illustrated in FIG. 1, any desired device or object may be used as the managed device 4. Examples of the managed device 4 include, but not limited to, a facsimile, a scanner, a printer, a copier, an electronic whiteboard, an air cleaner, a shredder, a bending machine, a watch, a camera, a game machine, a wheel chair, and a medical device such as an endoscope.

Example operation of managing location data using the location management system 1 is explained. In this example, the communication terminal 5 is capable of receiving a RF signal from the GPS satellite 999, when the communication terminal 5 is located outdoors γ. As the communication terminal 5 is moved to the indoors α, or when the communication terminal 5 is located indoors α, the communication terminal 5 receives a wireless signal, such as a RF signal, from the transmission device 3 of the electrical device 2, using the IMES. More specifically, the transmission device 3 transmits a signal, such as a RF signal having the same radio waveform as the signal transmitted from the GPS satellite 999. The communication terminal 5 receives the RF signal transmitted from the transmission device 3. Further, in this example, the RF signal includes location data X at which the transmission device 3 is located, in place of time data indicating the time. The communication terminal 5 receives the RF signal transmitted from the transmission device 3 to obtain the location data X. Accordingly, the communication terminal 5 does not have to perform calculation to obtain the location data X.

The communication terminal 5 further transmits the location data received from the transmission device 3 fixed onto the ceiling, and the terminal ID data B, to the location data management system 9. More specifically, in this example, the communication terminal 5 is provided with a wireless communicator capable of communicating data by wireless communication, such as by wireless LAN. Using the wireless communicator, the communication terminal 5 transmits the location data and the terminal ID data B to the transmission device 3. With the location data and the terminal ID data, the location data management system 9 is able to determine the location of the communication terminal 5.

In one example, the transmission device 3a, located on the ceiling a of the building, transmits the location data Xa indicating the location at which the transmission device 3a is located, by wireless communication. Assuming that the communication terminal 5a is moved to or located at a location where the signal from the transmission device 3a can be received, the communication terminal 5a receives the location data Xa. The communication terminal 5a transmits the device ID data Aa for identifying the communication terminal 5a, with the location data Xa, to the transmission device 3a. More specifically, the communication terminal 5a returns the location data Xa, received from the transmission device 3a, back to the transmission device 3a.

The transmission device 3a receives the terminal ID data Aa and the location data Xa, from the communication terminal 5a, for example, at a wireless communicator capable of communicating data by wireless communication. The transmission device 3a transmits the terminal ID data Aa and the location data Xa to the gateway 7, by wireless communication. The gateway 7 transmits the terminal ID data Aa and the location data Xa to the location data management system 9 via the LAN 8e. Based on the location data Xa, which is associated with the terminal 1D data Aa, the location data management system 9 is able to notify the user of the location at which the communication terminal 5a is currently located.

This operation of transmitting the location data X with the terminal ID data Aa is repeated, as the communication terminal 5a keeps moving. For example, as the communication terminal 5a moves to a location where the signal from another transmission device 3 can be received, the communication terminal 5a transmits the location data X received from that transmission device 3 with the terminal ID data Aa to the location management system 9. The location data management system 9 manages the terminal ID data Aa and the location data X, by constantly updating the location data X that is stored in association with the terminal ID data Aa. With this data being managed, the location data management system 9 is able to provide information regarding the location of the communication terminal 5a (managed device 4a) indoors α, or information regarding a route of the communication terminal 5a (managed device 4a) indoors α.

While the location management system of FIG. 1 allows the user to constantly monitor the location of the communication terminal 5 (managed device 4), this may require a large amount of electric power. For example, the wireless communicator in the communication terminal 5 tends to consume more electric power, than electric power being consumed by the GPS or IMES receiver at the transmission device 3. There is a need for reducing electric power consumption, especially, at the communication terminal 5 such as the portable device.

As illustrated in FIG. 1, for the communication terminals 5g and 5h, when the communication terminal 5 is located outdoors γ, the communication terminal 5 receives a RF signal including time data, orbit data, etc. from the GPS satellite 999, and calculates the location of the terminal 5 on the earth. Further, the communication terminals 5g and 5h use a mobile communication system such as 3G (third generation) or 4G (fourth generation) communication system to transmit the terminal ID data Ag and Ah and the location data Xg and Xh to the location data management system 9. More specifically, the communication terminals 5g and 5h transmit data via a base station 8a, a mobile communication network 8b, a gateway 8c, the Internet 8d, and the LAN 8e.

In this example, the base station 8a, the mobile communication network 8b, the gateway 8c, the Internet 8d, the LAN 8e, and the gateway 7 together form a communication network 8. In order to measure the latitude and the longitude of the managed device 4 (communication terminal 5) on the earth, at least three GPS satellites are necessary. Further, in order to measure the altitude in addition to the latitude and the longitude, four GPS satellites are necessary. For simplicity, only one GPS satellite 999 is shown in FIG. 1.

Figure 2:
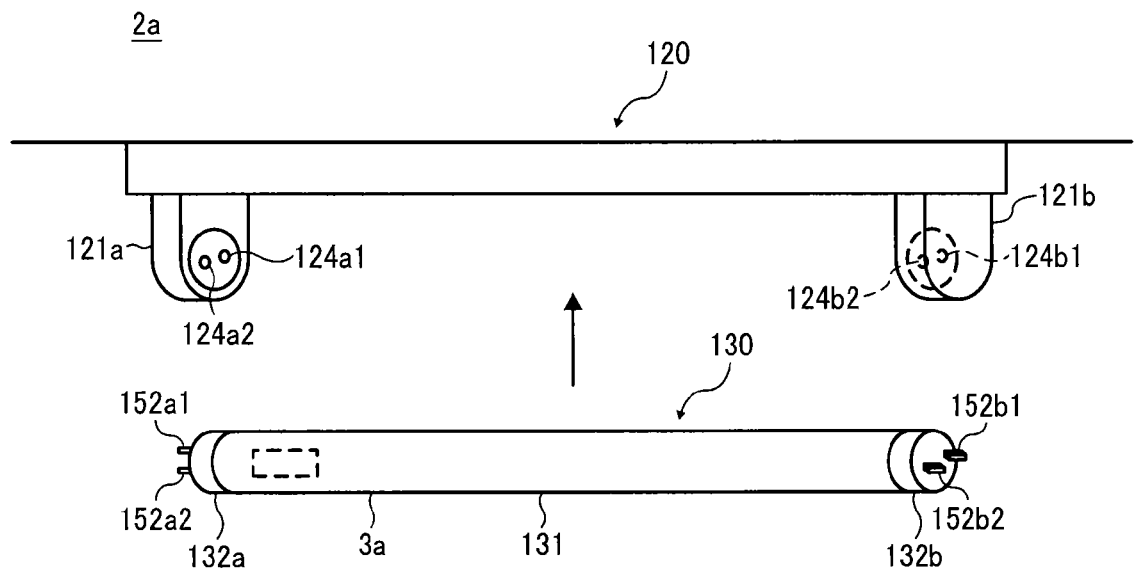
FIG. 2 an illustration of an outer appearance of a LED lighting device functioning as the electrical device of FIG. 1, according to an example embodiment of the present invention.

Referring now to FIG. 2, an outer appearance of the electrical device 2a, which is the fluorescent LED lighting device, is explained according to an example embodiment of the present invention. As illustrated in FIG. 2, the electrical device 2a is a straight tube lamp, and includes a casing 120 having a surface attached to the ceiling β and a LED lamp 130 that is housed in the casing 120.

The casing 120 has a socket 121a and a socket 121b at the respective ends. The socket 121a includes two power supply terminals 124a1 and 124a2, each of which supplies electric power to the LED lamp 130 when the LED lamp 130 is housed in the casing 120. The socket 121b includes two power supply terminals 124b1 and 124b2, each of which supplies electric power to the LED lamp 130 when the LED lamp 130 is housed in the casing 120. With these sockets, the casing 120 supplies electric power from a power source 1000 (FIG. 4) to the LED lamp 130.

The LED lamp 130 includes a translucent cover ("cover") 131, caps 132a and 132b that are provided at the respective ends of the cover 131, and the transmission device 3a placed inside the cover 131. The cover 131 may be made of, for example, resin material such as acrylic resin. The cover 131 covers a light source, such as a LED module provided inside.

The cap 132a has cap pins 152a1 and 152a2, which are respectively connected to the power supply terminals 124a1 and 124a2 of the socket 121a. The cap 132b has cap pins 152b1 and 152b1, which are respectively connected to the power supply terminals 124b1 and 124b2 of the socket 121b. As the LED lamp 130 is housed inside the casing 120, electric power is supplied to each of the cap pins 152a1, 152a2, 152b1, and 152b2, via the power supply terminals 124a1, 124a2, 124b1, and 124b2 of the casing 120. The LED lamp 130 emits light outside through the cover 131. The transmission device 3a is operated with electric power supplied from the casing 120.

Figure 3:
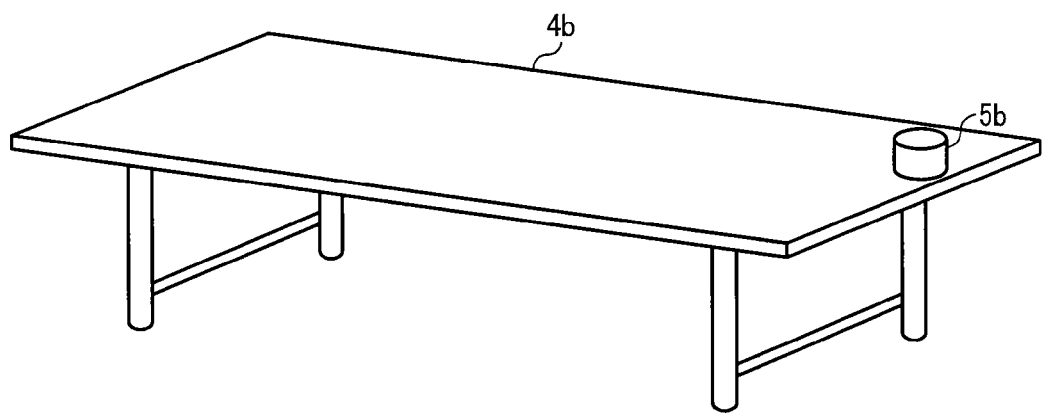
FIG. 3 is an illustration of the managed device of FIG. 1 on which a communication terminal is provided, according to an example embodiment of the present invention.

Referring to FIG. 3, the communication terminal 5b is provided on the upper surface of the managed device 4b, which is the table. As illustrated in FIG. 3, the communication terminal 5b is placed onto the upper surface of the managed device 4b. For example, the communication terminal 5b may be fixed onto the upper surface of the managed device 4b by double-sided adhesive tape. Alternatively, the communication terminal 5b may be simply placed onto the upper surface of the managed device 4b.

Figure 4:
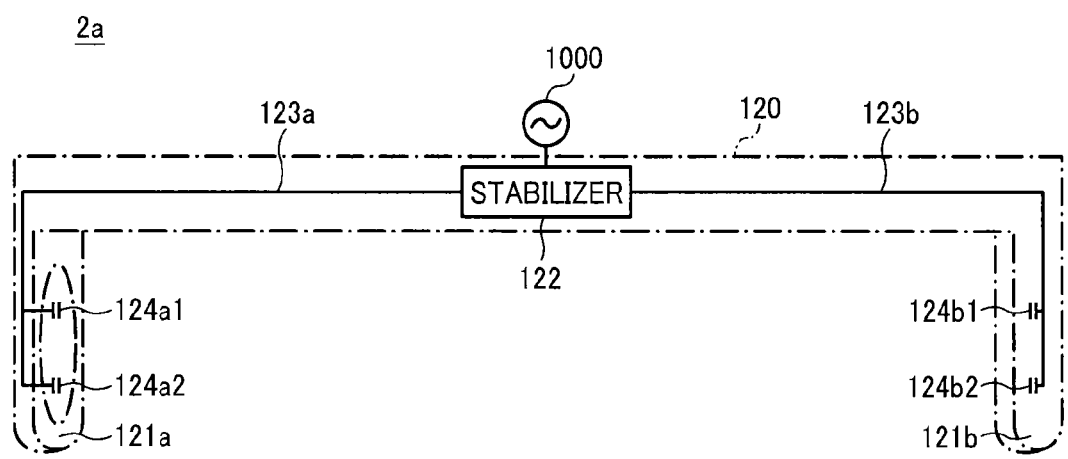
FIG. 4 is a schematic block diagram illustrating a hardware structure of a casing of a LED lighting device functioning as the electrical device of FIG. 1, according to an example embodiment of the present invention.

Referring to FIGS. 4 and 5, a hardware structure of the electrical device 2a, which is the LED lighting device, is explained according to an example embodiment of the present invention. FIG. 4 illustrates a hardware structure of the casing 120 of the LED lighting device 2a. FIG. 5 illustrates a hardware structure of the fluorescent LED lamp 130 of the LED lighting device 2a.

As illustrated in FIG. 4, the casing 120 mainly includes a stabilizer 122, lead wires 123a and 123b, and the power supply terminals 124a1, 124a2, 124b1, and 124b2. The stabilizer 122 controls electric currents supplied from the outside power source, such as the power source 1000. The stabilizer 122 and the power supply terminals 124a1, 124a2, 124b1, and 124b2 are electrically connected with one another by the lead wires 123a and 123b. With the stabilizer 122, electric power being supplied to each one of the power supply terminals 124a1, 124a2, 124b1, and 124b2, through the lead wires 123a and 123b, can be stabilized.

As illustrated in FIG. 5, the LED lamp 130 mainly includes a power supply controller ("power controller") 140, lead wires 151a and 151b, the cap pins 152a1, 152a2, 152b1, 152b2, lead wires 153, 154, and 155, a LED 160, and the transmission device 3a. The power supply controller 140 controls electric currents supplied from the power source 1000, and mainly includes an electric current monitor circuit 141 and a smoothing circuit 142. The electric current monitor circuit 141, which is input with electric currents from the power source 1000, rectifies the electric currents. The smoothing circuit 152 smoothes the rectified electric currents, and supplies each one of the cap pins 152a1, 152a2, 152b1, and 152b2 with the smoothened electric currents via the lead wires 151a and 151b.

The power supply controller 140 and the cap pins 152a1, 152a2, 152b1, and 152b2 are electrically connected via the lead wires 151a and 151b. The power supply controller 140 and the transmission device 3a are electrically connected through the lead wire 154. The LED 160 includes a plurality of LEDs, however, only one LED 160 s shown in FIG. 5 for the descriptive purposes. Except for the transmission device 3a, the LED lamp 130 of FIG. 5 has a structure substantially similar to that of the general-purpose LED lamp. In other words, in one example, the transmission device 3a may be previously incorporated in the LED lamp 130, during the manufacturing process. Alternatively, the transmission device 3a may be installed onto the general-purpose LED lamp, to cause the general-purpose LED lamp to function as the LED lamp 130.

Still referring to FIG. 5, a structure of the transmission device 3a is explained according to an example embodiment of the present invention. The transmission device 3a includes a voltage converter 100, a lead wire 155, a controller 11, a location data transmitter 12, and a wireless communicator 13. The voltage converter 100 is electrically connected to the controller 11, the location data transmitter 12, and the wireless communicator 13, via the lead wire 155.

The voltage converter 100 converts the electric voltage supplied from the power supply controller 140 to a drive voltage used for driving the transmission device 3a, and provides the drive voltage respectively to the controller 11, the location data transmitter 12, and the wireless communicator 13. More specifically, the drive voltage becomes a drive force of the transmission device 3a.

The controller 11 includes a central processing unit (CPU) 101 that controls entire operation of the controller 11, a read only memory (ROM) 102 that stores the basic input/output program, a random access memory (RAM) 103 that functions as a work memory area for the CPU 101, an interface 108a that transmits or receives signals with the location data transmitter 12, and an interface 108b that transmits or receives signals with the wireless communicator 13, which are electrically connected through a bus line 109 such as an address bus or a data bus.

The location data transmitter 12 includes a CPU 201 that controls entire operation of the location data transmitter 12, a ROM 202 that stores the basic input/output program and the location data Xa, a communication circuit 204 that transmits a signal including the location data Xa via an antenna 204a, and an interface (I/F) 208 that transmits or receives signals with the controller 11, which are electrically connected through a bus line 209 such as an address bus or a data bus.

In this example, the communication circuit 204 transmits the signal including the location data Xa via the antenna 204a, using the IMES, which is one example technology used for detecting the location of a target object indoors. In FIG. 1, the dashed line represents a range in which the location data X can be reached, that is, a range in which the location data X transmitted from the transmission device 3 can be received. In this example, the data transmission configuration of the transmission device 3 is determined, such that, in case the ceiling height of the room (indoors α) is about 3 meters, the radius of the virtual circle, represented by the dashed line on the floor, is about 5 meters. The virtual circle represents the range in which the location data X can be reached. The radius of the virtual circle may be made smaller or larger than 5 meters, depending on the data transmission configuration of the transmission device 3. For example, the data transmission configuration of the transmission device 3 may be previously set by a manufacturer, a provider of the location management system, or a user of the location management system.

The location data Xa indicates the location at which the electrical device 2a, which is implemented as the fluorescent LED lighting device, is located. As illustrated in FIG. 6, the location data X includes a plurality of items such as the floor, latitude, longitude, and building number. The table of FIG. 6 illustrates one example data structure of the location data X. The floor number ("floor") indicates the floor of the building at which the electric device 2a is located. The latitude and the longitude respectively indicate the latitude and the longitude of the location at which the electric device 2a is located. The building number indicates the number of the building at which the electrical device 2a is located. Referring to FIG. 6, the electrical device 2a is located at the 16th floor of the building "C", at the north latitude of 35.459555 degrees and the east longitude of 139.387110 degrees. The latitude may be expressed in terms of the south latitude. The longitude may be expressed in terms of the west longitude.

Referring back to FIG. 5, the wireless communicator 13 includes a CPU 301 that controls entire operation of the wireless communicator 13, a ROM 302 that stores the basic input/output program and the device ID data Ba, a RAM 303 functioning as a work area for the CPU 301, a communication circuit 304 that transmits a signal including the location data Xa and the terminal ID data A via an antenna 304a, which are received from the communication terminal 5, to a gateway 7 via an antenna 304a, an interface (I/F) 308 that transmits or receives signals with the controller 11, which are electrically connected through a bus line 309 such as an address bus or a data bus.

The wireless communicator 13 transmits or receives data in the 920 MHz band. The 920 MHz band is highly reliable as radio waves transmitted from the transmitter 3a can be reached at the gateway 7, even when an object, such as the column or the wall, is present between the transmitter 3a and the gateway 7.

The communication circuit 304 transmits or receives data via the antenna 304a, using at least the physical layer standard, of the IEEE802.15.4 standard architecture model. In such case, a MAC address may be used as the device ID data B for identifying the transmission device 3 (or the wireless communicator 13 in the transmission device 3).

Alternatively, ZigBee (Registered Trademark) standard, based on the physical layer and the MAC layer of the IEEE802.15.4 standard architecture model, may be used. In such case, depending on a region at which the transmission device 3 is provided such as Japan, U.S., and Europe, the transmission device 3 is capable of transmitting data to the gateway 7 via the other transmission device 3, which may be adjacent to the transmission device 3, using the 800 MHz, 900 MHz, or 2.4 GHz band. With the multi-hop communication in which data is transmitted via the other transmission device 3, the wireless communicator 13 of the transmission device 3 only needs to transmit data to the adjacent transmission device 3, which is closely located. While this may require time for routing, electric power for driving the transmission device 3 can be saved.

The location data Xa may be stored in a storage area 29 (FIG. 14) of the transmission device 3a, for example, by a manufacturer of the transmission device 3a before the transmission device 3a is shipped. Alternatively, the location data Xa may be stored in the storage area 29 of the transmission device 3a, for example, by a user who installs the electrical device 2a onto the ceiling β, after the transmission device 3a is shipped and before the electrical device 2a is installed onto the ceiling β. Alternatively, the communication circuit 304 of the wireless communicator 13 may receive the location data Xa from an external device such as the location data management system 9 via the gateway 7 by wireless communication. The controller 11 may store the location data Xa, which is received, in the ROM 202 of the location data transmitter 12.

Figures 7, 8, 9:
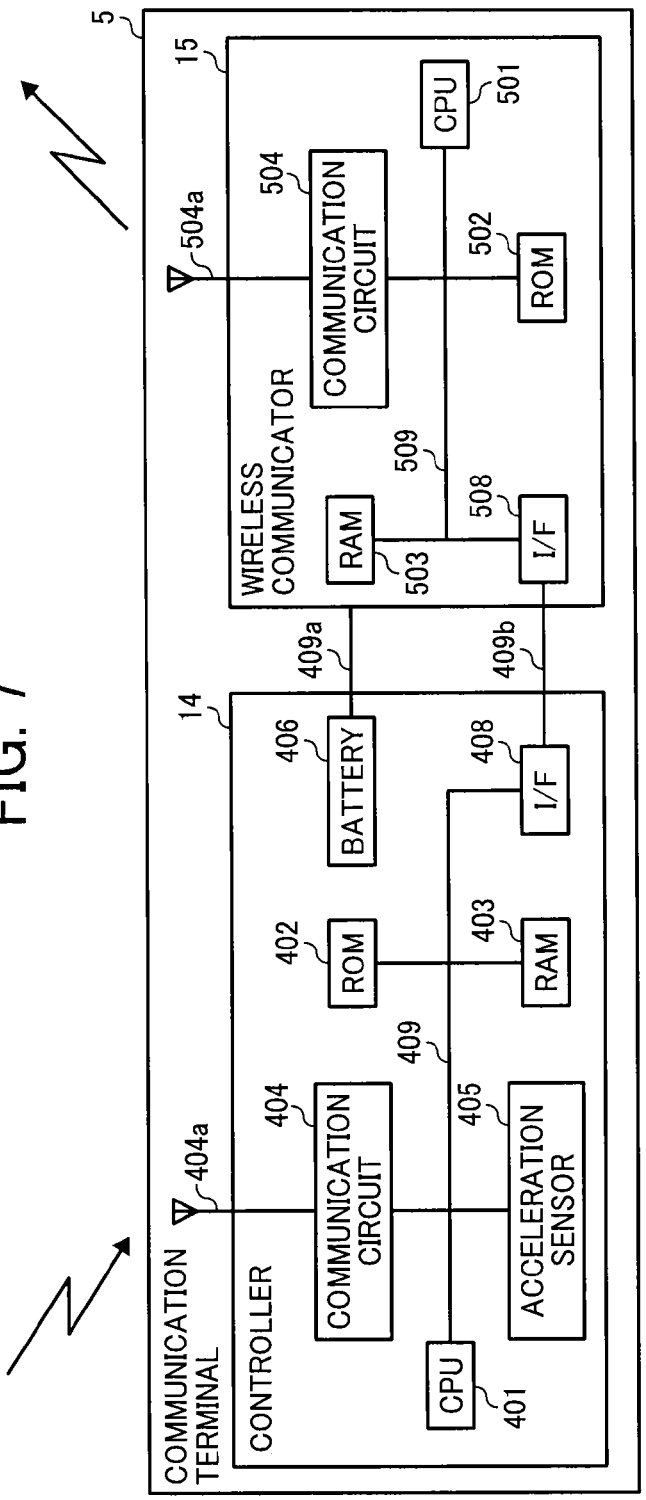
FIG. 7 is a schematic block diagram illustrating a hardware structure of the communication terminal of the managed device of FIG. 1, according to an example embodiment of the present invention.
FIG. 8 is an example data structure of location data.
FIG. 9 is an example data structure of data including the location data of FIG. 8.

Referring now to FIG. 7, a hardware structure of the communication terminal 5 is explained according to an example embodiment of the present invention. As illustrated in FIG. 7, the communication terminal 5 includes a controller 14 and a wireless communicator 15.

The controller 14 includes a CPU 401 that controls entire operation of the controller 14, a ROM 402 that stores the basic input/output program, a RAM 403 that functions as a work area for the CPU 401, a communication circuit 404 that receives the signal including the location data X via an antenna 404a, an acceleration sensor 405 that detects acceleration of the communication terminal 5, and an interface (I/F) 408 that transmits or receives signals with the wireless communicator 15, which are electrically connected through a bus line 409 such as an address bus or a data bus. The controller 14 is further provided with a button battery 406, which drives the controller 14. In this example, it is assumed that the button battery 406 is used. Alternatively, any other desired type of battery may be used, such as any standard cell battery including an AA battery, an AAA battery, etc., or a dedicated battery for the communication terminal 5.

The communication circuit 404 receives the location data X at the antenna 404a, which is transmitted from the transmission device 3 using the IMES. The controller 14 supplies electric power from the battery 406 to the wireless communicator 15 through a connector 409a. The controller 14 transmits or receives data such as signals to or from the wireless communicator 15, through the I/F 408 and the connector 409b.

The acceleration sensor 405 detects the change in acceleration of the communication terminal 5. The change in acceleration may be detected, for example, when the movement of the communication terminal 5 starts, or when the movement of the communication terminal 5 is stopped. The movement of the communication terminal 5 includes inclination of the communication terminal 5, even through the location of the communication terminal 5 does not change. In this example, the CPU 401 stops receiving or transmitting the location data X, when the acceleration sensor 405 detects that the communication terminal 5 stays at the same location or position. In such case, when the acceleration sensor 405 detects the change in acceleration of the communication terminal 5, the acceleration sensor 405 transmits an activation signal to the CPU 401 to cause the CPU 401 to start operation of receiving or transmitting the location data X. The CPU 401, which receives the activation signal, sends an activation signal to the communication circuit 404 to activate the communication circuit 404 to transmit or receive the location data X. Once activated, the communication circuit 404 of the communication terminal 5 starts receiving the location data X via the antenna 404a, from the transmission device 3 that sends the location data X.

The wireless communicator 15 is substantially similar in structure to the wireless communicator 13 of the transmission device 3 (FIG. 5). The wireless communicator 15 transmits or receives data with the wireless communicator 13 of the transmission device 3, using the same band being used by the wireless communicator 13. As illustrated in FIG. 7, the wireless communicator 15 includes a CPU 501 that controls entire operation of the wireless communicator 15, a ROM 502 that stores the basic input/output program and the terminal ID data A, a RAM 503 that functions as a work area for the CPU 501, a communication circuit 504 that transmits the location data X and the terminal ID data A via the antenna 504a, and an interface (I/F) 508 that transmits or receives signals with the controller 14, which are electrically connected through a bus line 509 such as an address bus or a data bus. The wireless communicator 15 may use the ZigBee standard.

The communication circuit 504 obtains the location data X received from the transmission device 3, which is stored in the RAM 403 of the controller 14, through the connector 409b according to an instruction received from the CPU 501. The communication circuit 504 reads out the terminal ID data A stored in the ROM 502, and sends the read terminal ID data A with the location data X to the transmission device 3 through the antenna 504a.

The location data X, which is transmitted from the communication circuit 504, may have a data structure as illustrated in FIG. 8. Referring to FIG. 8, the floor field, the latitude field, the longitude field, and the building number field are respectively expressed with 9-bit data, 21-bit data, 21-bit data, and 8-bit data. The description format of each field is in compliance with the IMES. The location data X is transmitted with the other data items as specified by the communication protocol, such as a header and checksum data. Of these items, information regarding a destination, a sender, and the contents of data such as the location data X are transmitted as illustrated in FIG. 9. FIG. 9 illustrates a data structure of data including the location data X.

Figure 10:
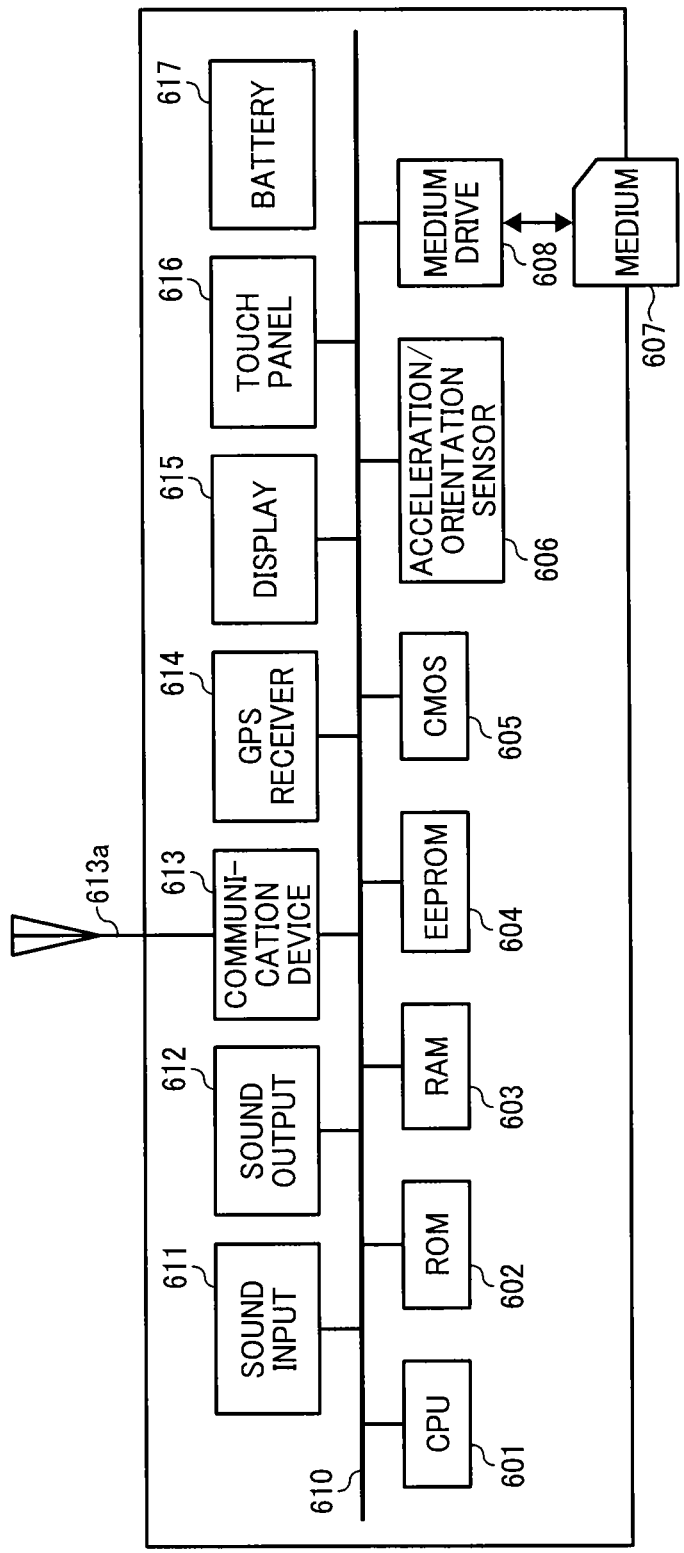
FIG. 10 is a schematic block diagram illustrating a hardware structure of a portable phone functioning as the managed device of FIG. 1, according to an example embodiment of the present invention.

Referring now to FIG. 10, a hardware structure of the managed device 4h (the communication terminal 5h), which is implemented as the portable phone, is explained according to an example embodiment of the present invention.

As illustrated in FIG. 10, the managed device 4h (the communication terminal 5h) includes a CPU 601 that controls entire operation of the communication terminal 5h, a ROM that stores the basic input/output program, a RAM 603 that functions as a work area for the CPU 601, an electrically erasable and programmable ROM (EEPROM) 604, a complementary metal oxide semiconductor (CMOS) sensor 605 that captures an image of an object under control of the CPU 601, an acceleration/orientation sensor 606 including various sensors such as an electromagnetic compass for detecting geomagnetism, gyrocompass, or acceleration sensor, and a medium drive 608 that controls reading or writing of data with respect to a recording medium 607 such as a flash memory. The recording medium 608 may be freely attached to or removed from the communication terminal 5h. When attached, data may be read out from or data may be written onto the recording medium 608 under control of the medium drive 608.

The EEPROM 604 stores therein the operating system (OS) executed by the CPU 601, various other programs, or various data. The CMOS sensor 605 is a charge coupled device that converts an optical image of an object into electric image data. As long as the object image can be captured, any desired sensor such as a charged coupled device (CCD) may be used.

The managed device 4h (the communication terminal 5h) further includes a sound input 611 that converts sounds to a sound signal, a sound output 612 that converts the sound signal to sounds, an antenna 613a, a communicator 613 that communicates with the base station 8a using a wireless communication (RF) signal via the antenna 613a, a GPS receiver 614 that receives a GPS signal from the GPS satellite 999, a display 615 that displays an image of an object or various icons such as a liquid crystal display or an organic EL, and a touch panel 616, which are electrically connected through a bus line 610 such as an address bus or a data bus. The touch panel 616 may be of a pressure-sensitive type or an electrostatic type, and provided on the display 615. The touch panel 616 detects the position on the display 615, which is touched with a finger of the user or a touch pen.

The managed device 4h (communication terminal 5h) further includes a dedicated battery 617, which drives the managed device 4h (communication terminal 5h). The sound input 611 includes a microphone that inputs sounds. The sound output 612 includes a speaker that outputs the sounds.

The GPS receiver 614 of the managed device 4h (communication terminal 5h) is substantially similar in function and operation to a GPS receiver that may be provided in the general-purpose portable phone, except for some differences. The differences include the program, such as firmware, stored in the ROM 602, which may be modified such that the communication terminal 5h is able to seamlessly receive data from the transmission device 3 indoors α or from the GPS satellite 999 outdoors γ, when the function of receiving is activated. The acceleration/orientation sensor 606 at least performs operations, which are performed by the acceleration sensor 405 of FIG. 7 to detect acceleration of the communication terminal 5h.

Figure 12:
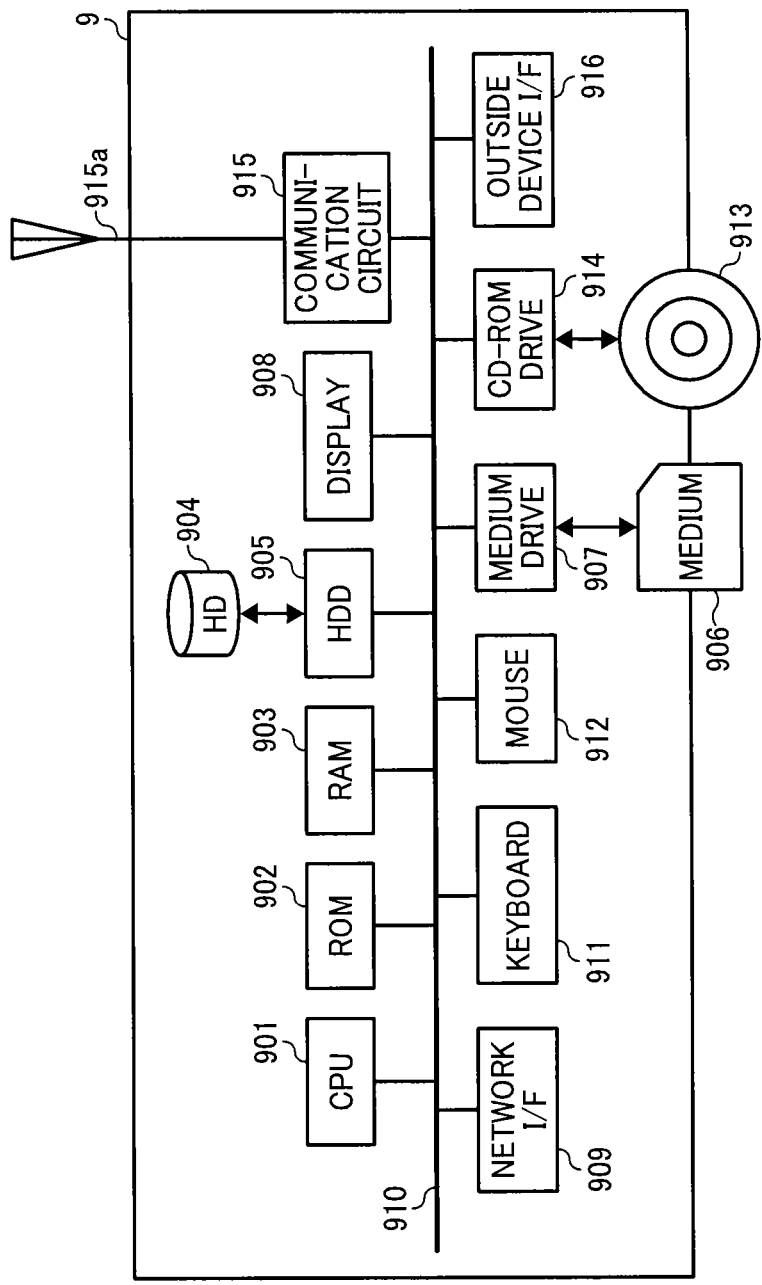
FIG. 12 is a schematic block diagram illustrating a hardware structure of a location data management system of FIG. 1.

The managed device 4g (the communication terminal 5g), which is a personal computer, has a hardware structure that is substantially similar to that of the location data management system 9 of FIG. 12, except for some differences. The differences include connection of a GPS antenna. In case of the managed device 4g implemented as the personal computer, the GPS antenna is connected to an outside device I/F 916 of FIG. 12. In one example, the outside I/F 916 may be a USB connector. If the personal computer is already provided with the GPS antenna, the GPS antenna does not have to be connected to the outside device I/F 916.

Figure 11:
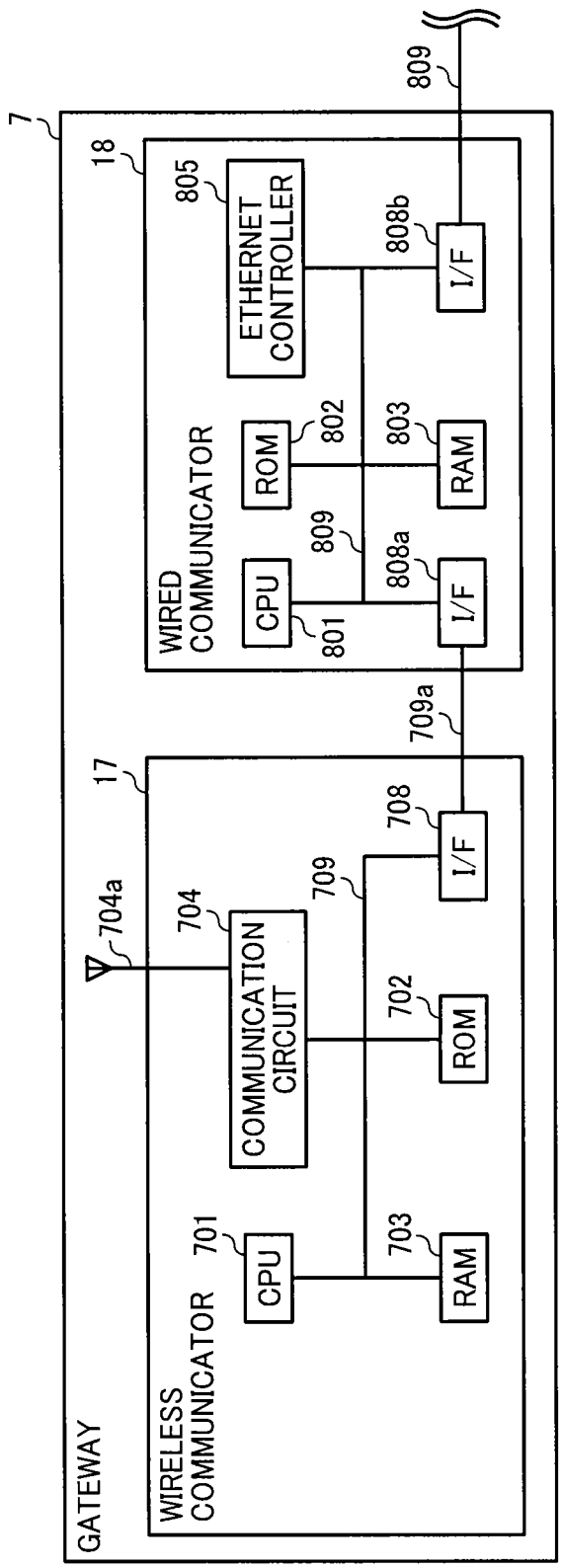
FIG. 11 is a schematic block diagram illustrating a hardware structure of a gateway of FIG. 1.

Referring to FIG. 11, a hardware structure of the gateway 7 is explained according to an example embodiment of the present invention. As illustrated in FIG. 11, the gateway 7 includes a wireless communicator 17 and a wired communicator 18.

The wireless communicator 17 has a structure that is substantially similar to that of the wireless communicator 13 of the transmission device 3 (FIG. 5). The wireless communicator 17 transmits or receives data with the wireless communicator 13 of the transmission device 3, using the same band used by the wireless communicator 13. As illustrated in FIG. 11, the wireless communicator 17 includes a CPU 701 that controls entire operation of the wireless communicator 17, a ROM 702 that stores the basic input/output program and device ID data C, a RAM 703 that functions as a work area for the CPU 701, a communication circuit 704 that transmits the location data X via an antenna 704a, and an I/F 708 that transmits or receives signals with the wired communicator 18, which are electrically connected through a bus line 709 such as an address bus or a data bus. The wireless communicator 17 transmits or receives signals to or from the wired communicator 18 through the I/F 708 and a connector 709a.

The wireless communicator 17 may use the ZigBee standard to communicate. The device ID data C is identification information for identifying the gateway 7, that is, the wireless communicator 17. The device ID data C may be a MAC address, for example.

As illustrated in FIG. 11, the wired communicator 18 includes a CPU 801 that controls entire operation of the wired communicator 18, a ROM 802 that stores the basic input/output program and device ID data D, a RAM 803 that functions as a work area for the CPU 801, an Ethernet controller 805, an I/F 808a that transmits or receives signals with the wireless communicator 17, and an I/F 808b that transmits or receives data (signal) with the LAN 8e via a cable 809, which are electrically connected through a bus line 809 such as an address bus or a data bus.

The CPU 801 and the Ethernet controller 805 cooperatively operate to convert a communication protocol in compliance with the IEEE802.15.4 standard, to a communication protocol in compliance with the IEEE802.3 standard. With this conversion, various data transmitted from the transmission device 3 can be communicated in the form of a packet based on the Ethernet (Registered Trademark).

The device ID data D is identification information for identifying the gateway 7, that is, the wired communicator 18. The device ID data D may be, for example, the Internet Protocol (IP) address. The ROM 802 may further store the MAC address.

Referring to FIG. 12, a hardware structure of the location data management system 9 is explained according to an example embodiment of the present invention.

The location data management system 9 is implemented by a computer, such as a personal computer. The location data management system 9 includes a CPU 901, a ROM 902, a RAM 903, a hard disk (HD) 904, a hard disk drive (HDD) 905, a medium drive 907, a display 908, a network I/F 908, a keyboard 911, a mouse 912, a CD-ROM drive 914, a communication circuit 915, and an outside device I/F 916, which are electrically connected through a bus line 910 such as an address bus or a data bus.

The CPU 901 controls entire operation of the location data management system 9. The ROM 902 stores a program used for driving the CPU 901 such as an initial program leader (IPL). The RAM 903 functions as a work area for the CPU 901. The HD 904 stores various data such as a location management program and system ID data E. The HDD 905 writes onto or reads from the HD 904 under control of the CPU 901. The medium drive 907 controls reading or writing data with a recording medium 906 such as a flash memory. The display 908 displays various data such as a cursor, menu, window, character, or image. The network I/F 908 communicates data through the communication network 8. The keyboard 911 is provided with a plurality of keys, such as the keys for inputting characters, numerals, or various instructions. The mouse 912 allows the user to select or execute various instructions, select a target for processing, or move the curser. The CD-ROM drive 914 controls reading or writing of various data with a compact disc read only memory (CD-ROM) 913, which is one example of a removable recording medium. The communication circuit 915 controls wireless communication via an antenna 915a. The outside device I/F 916 allows connection with the outside device.

The system ID data E is identification information that uniquely identifies the location data management system 9. The system ID data E may include an IP address, for example. The ROM 902 may further store the MAC address assigned to the location data management system 9.

Figure 25:
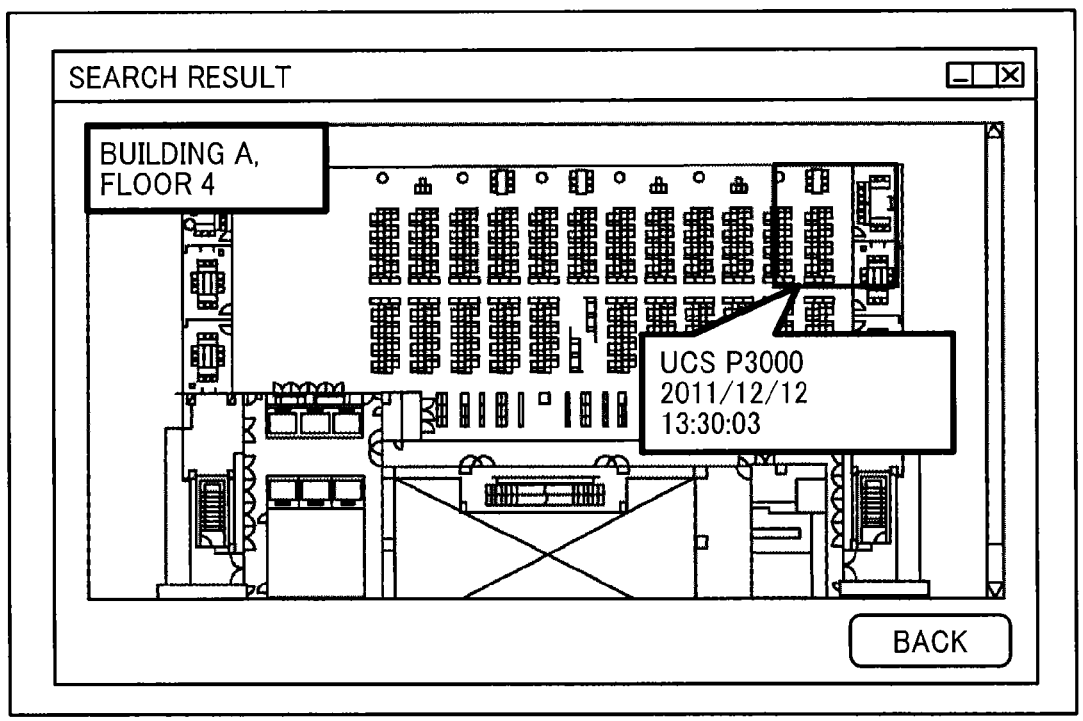
FIG. 25 is an illustration of an example screen, displayed by the location data management system.

The HD 904 stores data being managed ("management data F") as illustrated in FIG. 13, and layout data G indicating the layout of a floor as described below referring to FIG. 25. FIG. 13 is an example data structure of management data, managed by the location data management system 9.

Referring to FIG. 13, the management data F includes terminal ID data A, device name, owner name (administrator name), the location data X such as the latitude, longitude, floor, and building number, and the received date/time, which are associated with one another.

The terminal ID data A is identification information that identifies the communication terminal 5. The device name is a name of the managed device 4 or a name of the communication terminal 5. The owner name (administrator name) is a name of an owner, administrator, or user of the communication terminal 5. The location data X includes various information as illustrated in FIG. 6. The received date/time indicates the date/time at which the location data management system 9 receives the location data X from the gateway 7.

The terminal ID data A, the device name, and the owner name (administrator name) are stored in association with one another, under control of the location data management system 9. When the location data management system 9 receives the location data X and the terminal ID data A from the gateway 7, the location data management system 9 identifies a record for the terminal ID data A of the management data F and enters the location data X and the received date/time in the record for the terminal ID data A.

When the location data management system 9, which manages the location data X and the received date/time, receives additional location data X and additional terminal ID data A from the gateway 7, the location data management system 9 overwrites the stored location data X and received date/time, with the newly received location data X and the received date/time at which the additional location data X is received.

Alternatively, the location data management system 9 may write the newly received location data X and received date/time, by adding a new record for the terminal ID data A, without overwriting the stored location data X and received date/time.

Figure 14:
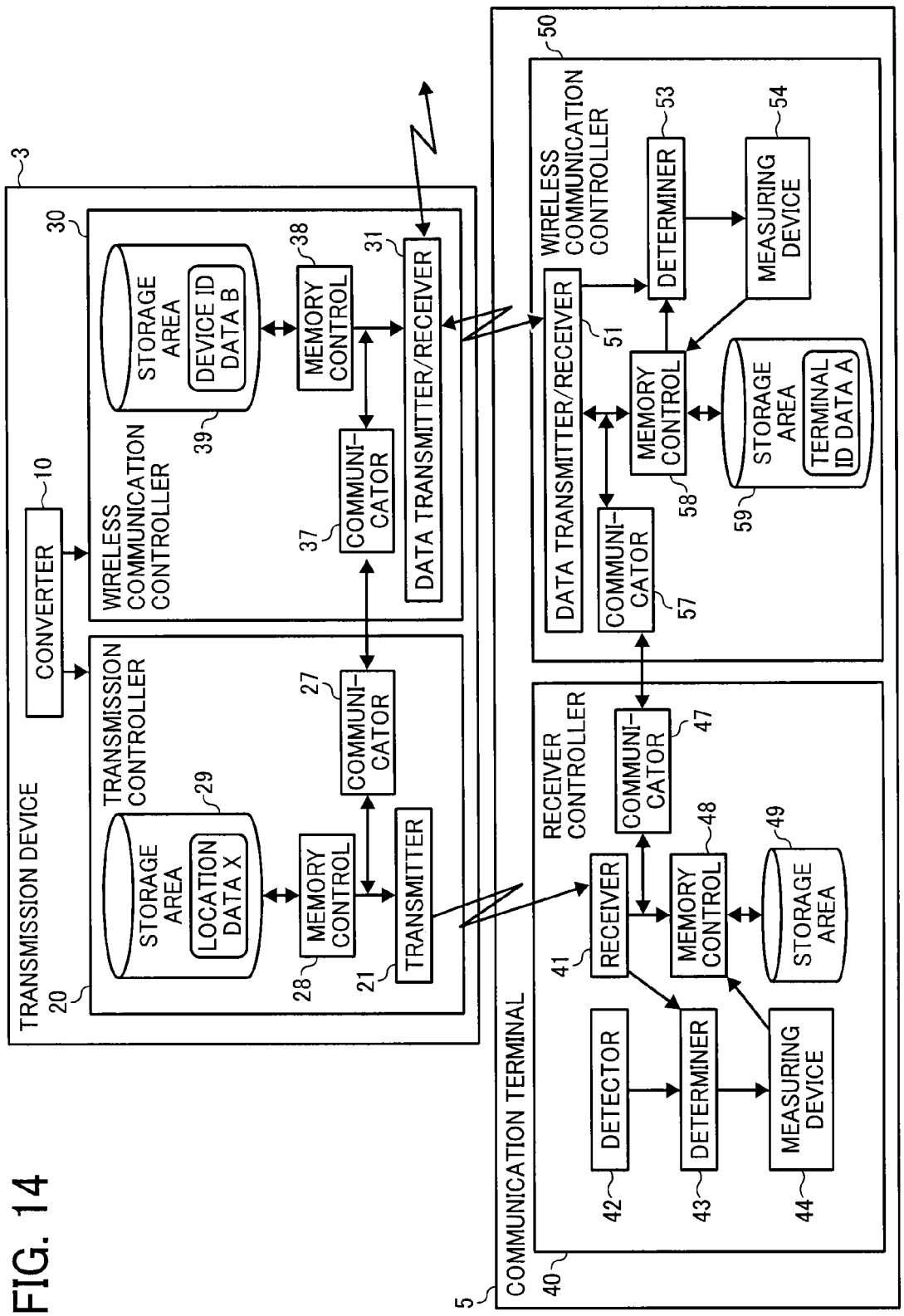
FIG. 14 is a schematic block diagram illustrating functional structures of the transmission device and the communication terminal of the location management system of FIG. 1, according to an example embodiment of the present invention.
Figure 15:
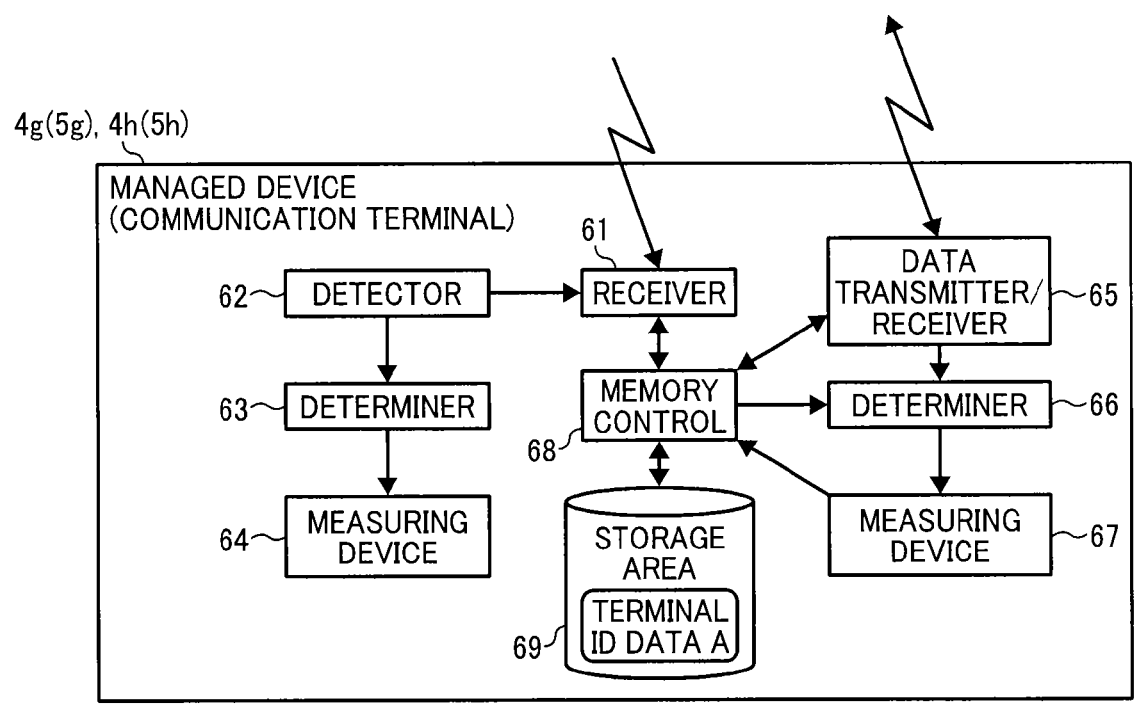
FIG. 15 is a schematic block diagram illustrating a functional structure of a portable device or a personal computer, functioning as the managed device of FIG. 1, according to an example embodiment of the present invention.
Figure 16:
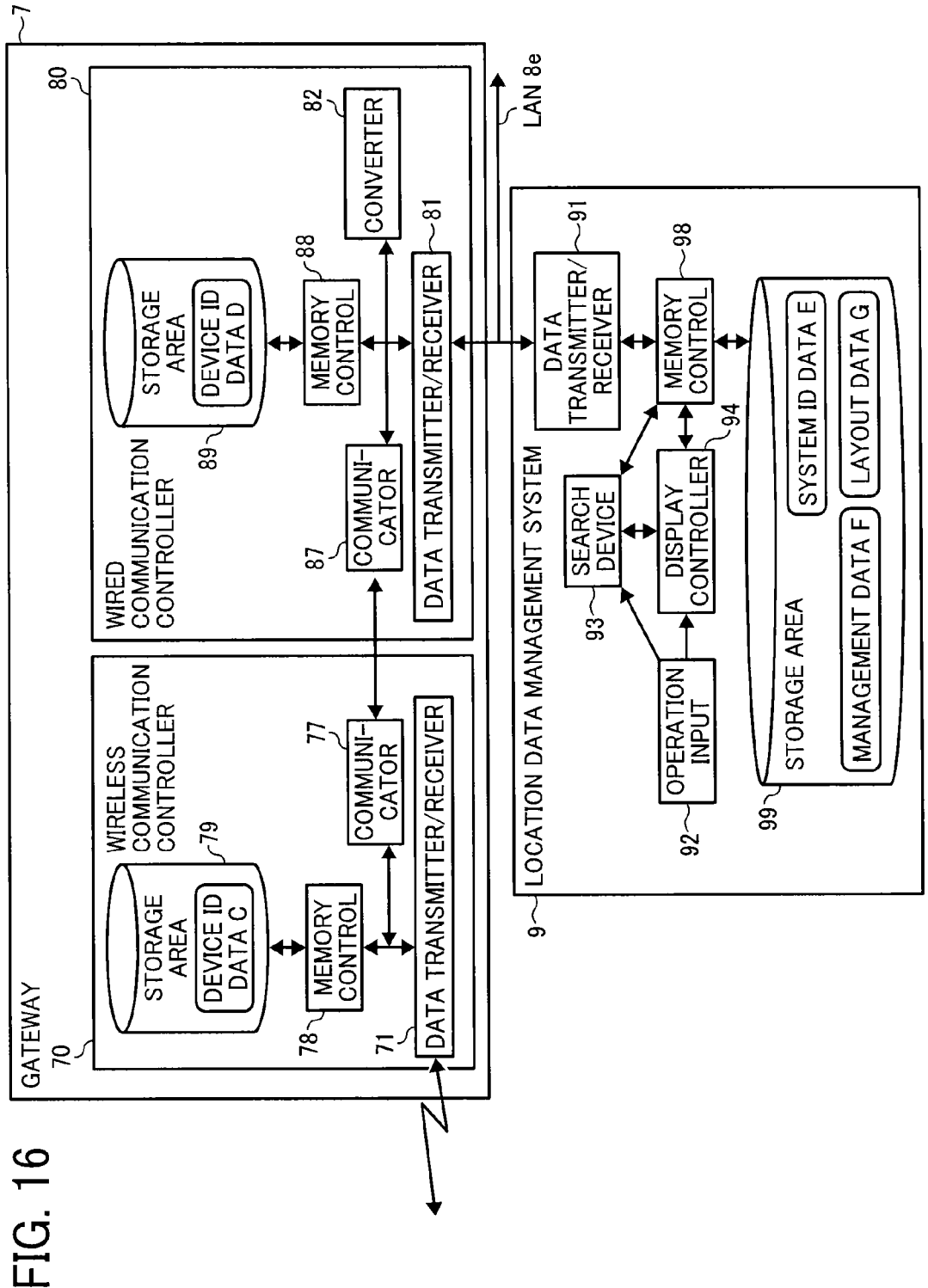
FIG. 16 is a schematic block diagram illustrating functional structures of the gateway of FIG. 11 and the location data management system of FIG. 12, according to an example embodiment of the present invention.

Referring now to FIGS. 14 to 16, a functional structure of the location management system 1 is explained according to an example embodiment of the present invention. More specifically, in this example, the operation or functions that are performed by the location management system 1, which include the operations or functions performed by the units shown in FIGS. 14, 15, and 16, are performed in relation to one or more hardware devices of the transmission device 3 of FIG. 5, the communication terminal 5 of FIG. 7, the gateway 7 of FIG. 11, and the location data management system 9 of FIG. 12.

Referring to FIG. 14, the functional structures of the transmission device 3 and the communication terminal 5 are explained. The transmission device 3 includes a converter 10, a transmission controller 20, and a wireless communication controller 30, each of which is a functional module or unit of the transmission device 3. The converter 10 corresponds to the function provided by the voltage converter 100 of FIG. 5.

The transmission controller 20 corresponds to the function provided by the controller 11 that operates with the location data transmitter 12 of FIG. 5. The wireless communication controller 30 corresponds to the function provided by the controller 11 that operates with the wireless communicator 13 of FIG. 5.

The transmission controller 20 is provided with the storage area 29, which may be implemented by a memory such as the ROM 202 illustrated in FIG. 5. The storage area 29 stores therein the location data X, as described above. The transmission controller 20 includes a transmitter 21, a communicator 27, and a memory control 28 having the function of writing or reading data.

The transmitter 21 is implemented by operations performed by the CPU 201 and the communication circuit 204 of FIG. 5, and transmits the location data X in a transmission range.

The communicator 27 is implemented by operations performed by the CPUs 101 and 201 of FIG. 5, the I/F 108a and 208, and the bus 109a and 209. The communicator 27 controls communication of data (signals) with the wireless communication controller 30.

The memory control 28, which may be implanted by operations performed by the CPUs 101 and 201 of FIG. 5, stores various data in the storage area 29 or read various data from the storage area 29. The memory control 28 writes or reads data such as the location data X with respect to the storage area 29.

The wireless communication controller 30 includes a storage area 39, which may be implemented by a memory such as the ROM 302 of FIG. 5. The storage area 39 stores therein the device ID data B.

The data transmitter/receiver 31, which may be implemented by operations performed by the CPU 301 and the communication circuit 304 of FIG. 5, transmits or receives various data with the communication terminal 5 or the gateway 7, by wireless communication.

The communicator 37, which may be implemented by operations performed by the CPUs 101 and 301, the I/F 108b and 308, or the bus 109b and 309, communicates data such as signals with the transmission controller 20.

The memory control 38 stores various data in the storage area 39, or reads out various data from the storage area 39.

Still referring to FIG. 14, a functional structure of the communication terminal 5 is explained according to an example embodiment of the present invention.

The communication terminal 5 includes a receiver controller 40 and a wireless communication controller 50, each of which is a functional module or unit of the communication terminal 5.

The receiver controller 40 includes a storage area 49, which may be implemented by a memory such as the RAM 403 of FIG. 7. The storage area 49 may store the location data X transmitted from the transmission device 3. The receiver controller 40 further includes a receiver 41, a detector 42, a determiner 43, a measuring device 44, a communicator 47, and a memory control 48.

The receiver 41, which may be implemented by operations performed by the CPU 401 and the communication circuit 404, receives the location data X transmitted from the transmission device 3. The receiver 41 may switch its operation state, for example, between the state at which the location data X can be received, and the state at which the location data X cannot be received.

The detector 42, which may be implemented by operations performed by the CPU 401 and the acceleration sensor 405 of FIG. 7, detects the movement of the communication terminal 5 including the inclination of the communication terminal 5. When the movement is detected, the detector 42 causes the receiver 41 to start operation of receiving data. The detector 42 may be implemented by a motion sensor using inertia force or magnetic force, in alternative to the acceleration sensor 405.

The determiner 43, which may be implemented by operations performed by the CPU 401 of FIG. 7, determines whether the receiver 41 receives at least one item of location data X. The determiner 41 may further determine whether a plurality of items of location data X is received respectively from the plurality of transmission devices 3 at the receiver 41. In such case, the location data X transmitted from the same transmission device 3 may be treated as one item of location data, even through such data is received more than once during a predetermined time period.

The measuring device 44, which may be implemented by operations performed by the CPU 201 of FIG. 7, measures the signal intensity of the location data X, for each item of location data X, when the determiner 43 determines that the plurality of items of location data X is received respectively from the transmission devices 3.

The communicator 47, which may be implemented by operations performed by the CPU 401, the I/F 408, and the bus 409 (FIG. 7), communicates data such as signals to the wireless communication controller 50.

The memory control 48, which may be implemented by operations performed by the CPU 401, stores various data in the storage area 49, or reads out various data from the storage area 49. For example, the memory control 48 stores the location data X in, or reads out the location data X from, the storage area 49.

The wireless communication controller 50 includes a storage area 59, which may be implemented by a memory such as the ROM 502 of FIG. 5. The storage area 59 stores therein the terminal ID data A. The wireless communication controller 50 further includes a data transmitter/receiver 51, a determiner 53, a measuring device 54, a communicator 57, and a memory control 58.

The data transmitter/receiver 51, which may be implemented by operations performed by the CPU 501 and the communication circuit 504 of FIG. 7, transmits or receives various data to or from the transmission device 3 by wireless communication.

The determiner 53, which may be implemented by operations performed by the CPU 501 of FIG. 7, determines whether the receiver 51 receives at least one item of device ID data B. The determiner 53 further determines whether the receiver 51 receives a plurality of items of device ID data B, respectively from the plurality of transmission devices 3. In such case, the device ID data B transmitted from the same transmission device 3 may be treated as one item of device ID data, even through such data is received more than once during a predetermined time period.

The measuring device 54, which may be implemented by operations performed by the CPU 501 of FIG. 7, measures the signal intensity of the device ID data B, for each item of the device ID data B, when the determiner 53 determines that the plurality of items of device ID data B is received respectively from the transmission devices 3.

The communicator 57, which may be implemented by operations performed by the CPU 501, the I/F 508, and the bus 509, communicates data such as signals with the receiver controller 40.

The memory control 58, which may be implemented by operations performed by the CPU 501 of FIG. 7, stores various data in the storage area 59, or reads out various data from the storage area 59. For example, the memory control 58 stores the terminal ID data A, in, or reads out the terminal ID data A from the storage area 59.

Referring now to FIG. 15, a functional structure of the managed device 4 is explained according to an example embodiment of the present invention, when the managed device 4 is implemented as a portable phone (such as the managed device 4h) or a personal computer (such as the managed device 4g).

Referring to FIG. 15, the managed device 4 (4g, 4h) includes a receiver 61, a detector 62, a determiner 63, a measuring device 64, a data transmitter/receiver 65, a determiner 66, a measuring device 67, a memory control 68, and a storage area 69.

In one example, the managed device 4 is implemented as the portable device 4h having a hardware structure as illustrated in FIG. 10. In such case, the storage area 69 is implemented by the EEPROM 604 of FIG. 10.

The receiver 61, which may be implemented by operations performed by the CPU 601 and the GPS receiver 614 of FIG. 10, performs the functions that are substantially similar to the functions performed by the receiver 41 of FIG. 14.

The detector 62, which may be implemented by operations performed by the CPU 610 and the acceleration/orientation sensor 606 of FIG. 10, performs the functions that are substantially similar to the functions performed by the detector 42 of FIG. 14.

The determiner 63, which may be implemented by operations performed by the CPU 601 of FIG. 10, performs the functions that are substantially similar to the functions performed by the determiner 43 of FIG. 14

The measuring device 64, which may be implemented by operations performed by the CPU 601 of FIG. 10, performs the functions that are substantially similar to the functions performed by the measuring device 44 of FIG. 14.

The data transmitter/receiver 65, which may be implemented by operations performed by the CPU 601 and the communicator 613 of FIG. 10, performs the functions that are substantially similar to the functions performed by the data transmitter/receiver 51 of FIG. 14.

The determiner 66, which may be implemented by operations performed by the CPU 601 of FIG. 10, performs the functions that are substantially similar to the functions performed by the determiner 53 of FIG. 14.

The measuring device 67, which may be implemented by operations performed by the CPU 601 of FIG. 10, performs the functions that are substantially similar to the functions performed by the measuring device 54 of FIG. 14.

The memory control 68, which may be implemented by operations performed by the CPU 601 of FIG. 10, performs the functions that are substantially similar to the functions performed by the memory control 48 or the memory control 58 of FIG. 14.

In one example, the managed device 4 is implemented as the personal computer 4g having a hardware structure as illustrated in FIG. 12. In such case, the storage area 69 is implemented by a memory such as the RAM 903 or the HD 904 of FIG. 12.

The receiver 61, which may be implemented by operations performed by the CPU 901 and the GPS antenna connected to the outside device I/F 916 of FIG. 12, performs the functions that are substantially similar to the functions performed by the receiver 41 of FIG. 14.

The detector 62, which may be implemented by operations performed by the CPU 901 and the acceleration sensor connected to the outside device I/F 916 of FIG. 12, performs the functions that are substantially similar to the functions performed by the detector 42 of FIG. 14.

The determiner 63, which may be implemented by operations performed by the CPU 901 of FIG. 12, performs the functions that are substantially similar to the functions performed by the determiner 43 of FIG. 14.

The measuring device 64, which may be implemented by operations performed by the CPU 901 of FIG. 12, performs the functions that are substantially similar to the functions performed by the measuring device 44 of FIG. 14.

The data transmitter/receiver 65, which may be implemented by operations performed by the CPU 901 and the communication circuit 915 of FIG. 12, performs the functions that are substantially similar to the functions performed by the data transmitter/receiver 51 of FIG. 14.

The determiner 66, which may be implemented by operations performed by the CPU 901 of FIG. 12, performs the functions that are substantially similar to the functions performed by the determiner 53 of FIG. 14.

The measuring device 67, which may be implemented by operations performed by the CPU 901 of FIG. 12, performs the functions that are substantially similar to the functions performed by the measuring device 54 of FIG. 14.

The memory control 68, which may be implemented by operations performed by the CPU 901 of FIG. 12, performs the functions that are substantially similar to the functions performed by the memory control 48 or the memory control 58 of FIG. 14.

FIG. 16 illustrates functional structures of the gateway 7 and the location data management system 9 of FIG. 1.

Referring now to FIG. 16, a functional structure of the gateway 7 is explained according to an example embodiment of the present invention. The gateway 7 includes a wireless communication controller 70 and a wired communication controller 80, each of which is a functional module or unit of the gateway 7.

The wireless communication controller 70, which corresponds to the functions performed by the wireless communicator 17 of FIG. 11, provides the functions that are substantially similar to the functions performed by the wireless communication controller 30 of the transmission device 3 of FIG. 14.

More specifically, the wireless communication controller 70 includes a storage area 79, which is implemented by a memory such as the ROM 702 of FIG. 11. The storage area 79 stores therein the device ID data C. The wireless communication controller 70 includes a data transmitter/receiver 71, a communicator 77, and a memory control 78.

The data transmitter/receiver 71, which corresponds to operations performed by the CPU 701 and the communication circuit 704, transmits or receives various data with the transmission device 3 by wireless communication.

The communicator 77, which may be implemented by operations performed by the CPU 701, the I/F 708, and the bus 709, communicates data (signals) with the wired communication controller 80.

The memory control 78, which may correspond to operations performed by the CPU 701, stores various data in the storage area 79, or reads out various data from the storage area 79.

The wired communication controller 80 corresponds to the operations performed by the wired communicator 18 of FIG. 11. The wired communication controller 80 includes a storage area 89, which may be implemented by a memory such as the RAM 803 of FIG. 11. The storage area 89 stores therein the device ID data D. The wired communication controller 80 includes a data transmitter/receiver 81, a converter 82, a communicator 87, and a memory control 88.

The data transmitter/receiver 81, which may be implemented by operations performed by the CPU 801 and the I/F 808b, transmits or receives various data with the location data management system 9 by wired communication.

The converter 82, which may be implemented by operations performed by the CPU 801 and the Ethernet controller 805 of FIG. 11, converts various data, received from the transmission device 3, to have a communication protocol compatible with the Ethernet. With this conversion, data can be transmitted in a packet in compliance with the Ethernet.

The communicator 87, which may be implemented by operations performed by the CPU 801, the I/F 808a, and the bus 809, communicates data (signals) with the wireless communication controller 70.

The memory control 88, which may be implemented by operations performed by the CPU 801, stores various data in the storage area 89, or reads out various data from the storage area 89.

Still referring to FIG. 16, a functional structure of the location data management system 9 is explained according to an example embodiment of the present invention.

The location data management system 9 includes a storage area 99, which may be implemented by a memory such as the RAM 903 and the HDD 904 of FIG. 12. The storage area 99 stores therein the system ID data E, the management data F, and the layout data G. The location data management system 9 includes a data transmitter/receiver 91, an operation input 92, a search device 93, a display control 94, and a memory control 98.

The data transmitter/receiver 91, which may be implemented by operations performed by the CPU 901, the network I/F 909, and the communication circuit 915 of FIG. 12, transmits or receives various data with the gateway 7 by wired communication or wireless communication. The data transmitter/receiver 91 transmits or receives various data to or from the communication terminal 5h outdoors γ via the communication network 8.

The operation input 92, which may be implemented by operations performed by the CPU 901, the keyboard 911, or the mouse 912, receives selection or input from a user such as an administrator.

The search device 93, which may be implemented by operations performed by the CPU 901, searches through the management data F stored in the storage area 99 via the memory control 98, using a search request received from the operation input 92, to output a search result.

The display control 94, which may be implemented by operations performed by the CPU 901, controls display of various images or characters on the display 908.

The memory control 98, which may be implemented by operations performed by the CPU 901, stores various data in the storage area 99, or reads out various data from the storage area 99.

Referring now to FIGS. 17 to 25, example operation, performed by the location management system 1 of FIG. 1, is explained.

Figure 17:
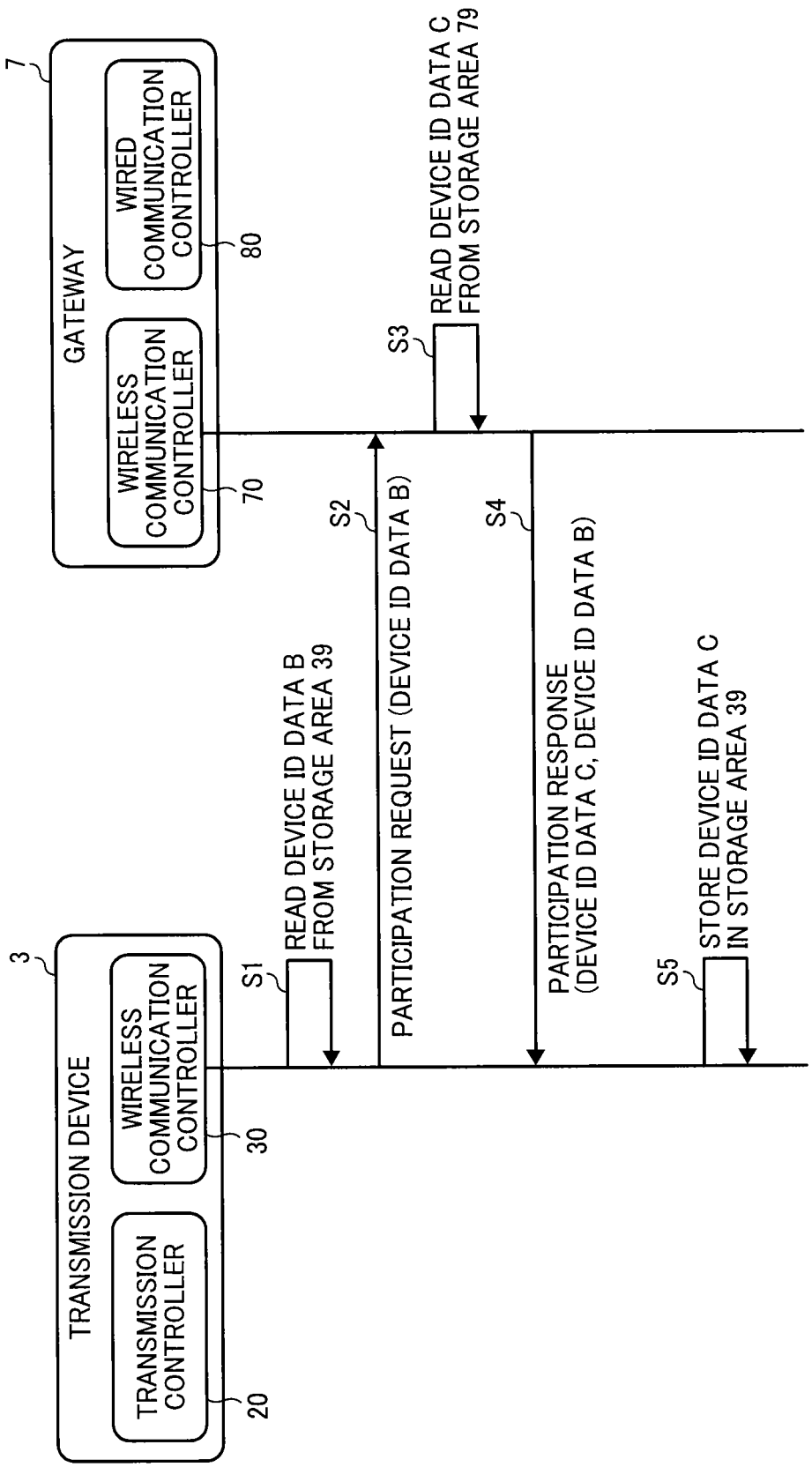
FIG. 17 is a data sequence diagram illustrating operation of establishing a communication network between at least one transmission device and the gateway, according to an example embodiment of the present invention.

Referring to FIG. 17, operation of establishing a communication network using the transmission device 3, which is provided on the ceiling β indoors α, is explained according to an example embodiment of the present invention. The operation of FIG. 17 may be performed for each one of the transmission devices 3 on the location management system 1.

As electric power of the electrical device 2 indoors α is turned on by a user, at S1, the memory control 38 of the wireless communication controller 30 of the transmission device 3 (FIG. 14) reads out the device ID data B from the storage area 39. At S2, the data transmitter/receiver 31 sends a participation request to the gateway 7, which includes its device ID data B that is read at S1. The data transmitter/receiver 71 of the wireless communication controller 70 of the gateway 7 receives the participation request.

At S3, the memory control 78 of the wireless communication controller 70 reads out the device ID data C from the storage area 79. At S4, the data transmitter/receiver 71 sends a participation response to the transmission device 3, which includes the device ID data B and C. The data transmitter/receiver 31 of the wireless communication controller 30 of the transmission device 3 receives the participation response. The wireless communication controller 30 is able to determine that the participation response received at S4 is transmitted in response to the participation request transmitted at S1, based on the device ID data B. Based on this determination, the wireless communication controller 30 determines that the participation response is successfully received in response to the participation request. At S5, the memory control 38 stores the device ID data C in the storage area 39.

Through operation of FIG. 17, the transmission device 3 stores the device ID data C of the gateway 7, thus establishing the communication network between the transmission device 3 and the gateway 7.

Figure 18:
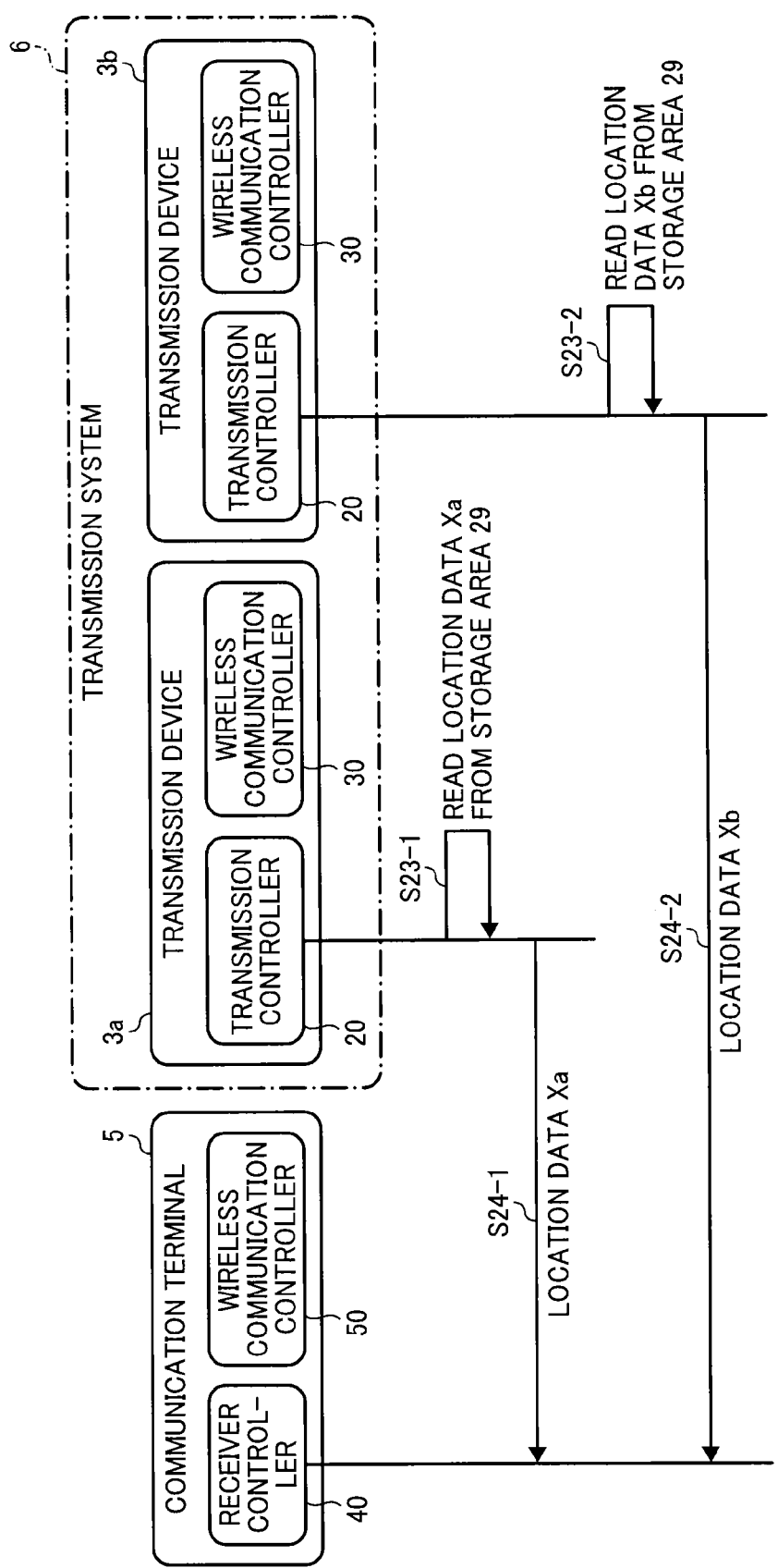
FIG. 18 is a data sequence diagram illustrating operation of transmitting location data from a transmission system and receiving the location data at the communication terminal, according to an example embodiment of the present invention.

Referring now to FIG. 18, operation of transmitting the location data from the transmission device 3 on the ceiling β indoors α, and receiving the location data at the communication terminal 5, is explained according to an example embodiment of the present invention.

For descriptive purposes, it is assumed that two transmission devices 3a and 3b, which are located adjacent with each other, form a transmission system 6. The transmission device 3a transmits location data Xa, and the transmission device 3b transmits location data Xb. Further, in this example referring to FIG. 18, the communication terminal 5 is located in the range, such that the location data Xa and Xb, which are respectively transmitted from the transmission devices 3a and 3b, can be reached at the communication terminal 5. For example, the communication terminal 5 is located in an area where the transmission range of the transmission device 3a and the transmission range of the transmission device 3b overlaps with each other, as described below referring to FIG. 21. In such case, the communication terminal 5 may receive more than one location data X.

At S23-1, the memory control 28 of the transmission controller 20 of the transmission device 3a reads out the location data Xa, assigned to the transmission device 3a, from the storage area 29.

At S24-1, the transmitter 21 of the transmission controller 20 of the transmission device 3a transmits the location data Xa, so that the location data Xa can be received at the communication terminal 5 located within the transmission range of the transmission device 3a.

In a substantially similar manner as described above referring to S23-1 and S24-1, at S23-2, the memory control 28 of the transmission controller 20 of the transmission device 3b reads out the location data Xb, assigned to the transmission device 3b, from the storage area 29.

At S24-2, the transmitter 21 of the transmission controller 20 of the transmission device 3b transmits the location data Xb, so that the location data Xb can be received at the communication terminal 5 located within the transmission range of the transmission device 3b.

In this example, it is assumed that the receiver 41 of the communication terminal 5 is activated to receive the location data Xa and Xb, based on the detected movement of the communication terminal 5. In other words, even though the location data Xa and Xb are transmitted, the communication terminal 5 can only receive the location data Xa and Xb only when the receiver 41 is activated.

When the communication terminal 5 receives more than one location data X, the communication terminal 5 needs to determine one of the location data X to be transmitted, and further determine one of the transmission devices 3 to which the location data X is transmitted. FIGS. 19A and 19B (FIG. 19) illustrate a data sequence diagram illustrating example operation of determining the location data X to be used by the communication terminal 5, and determining a destination transmission device 3 to which the location data X is to be transmitted. In FIG. 19, it is assumed that the communication terminal 5 determines to use the location data Xa received from the transmission device 3a, and transmits the location data Xa to the destination transmission device 3b. More specifically, the transmission device 3b to which the location data X is transmitted is different than the transmission device 3a from which the location data X is received.

At S41, the memory control 48 of the receiver controller 40 of the communication terminal 5 selects one of the location data Xa transmitted from the transmission device 3a or the location data Xb transmitted from the transmission device 3b, which has the highest signal intensity, as the location data X to be used. In this example, the signal intensity used for determination is a signal intensity that is measured when the communication terminal 5 receives the location data X. The selected location data X is stored in the storage area 49. This location data X, selected and stored at S41, will be later used by the location data management system 9 as information indicating the current location of the communication terminal 5.

Figure 20:
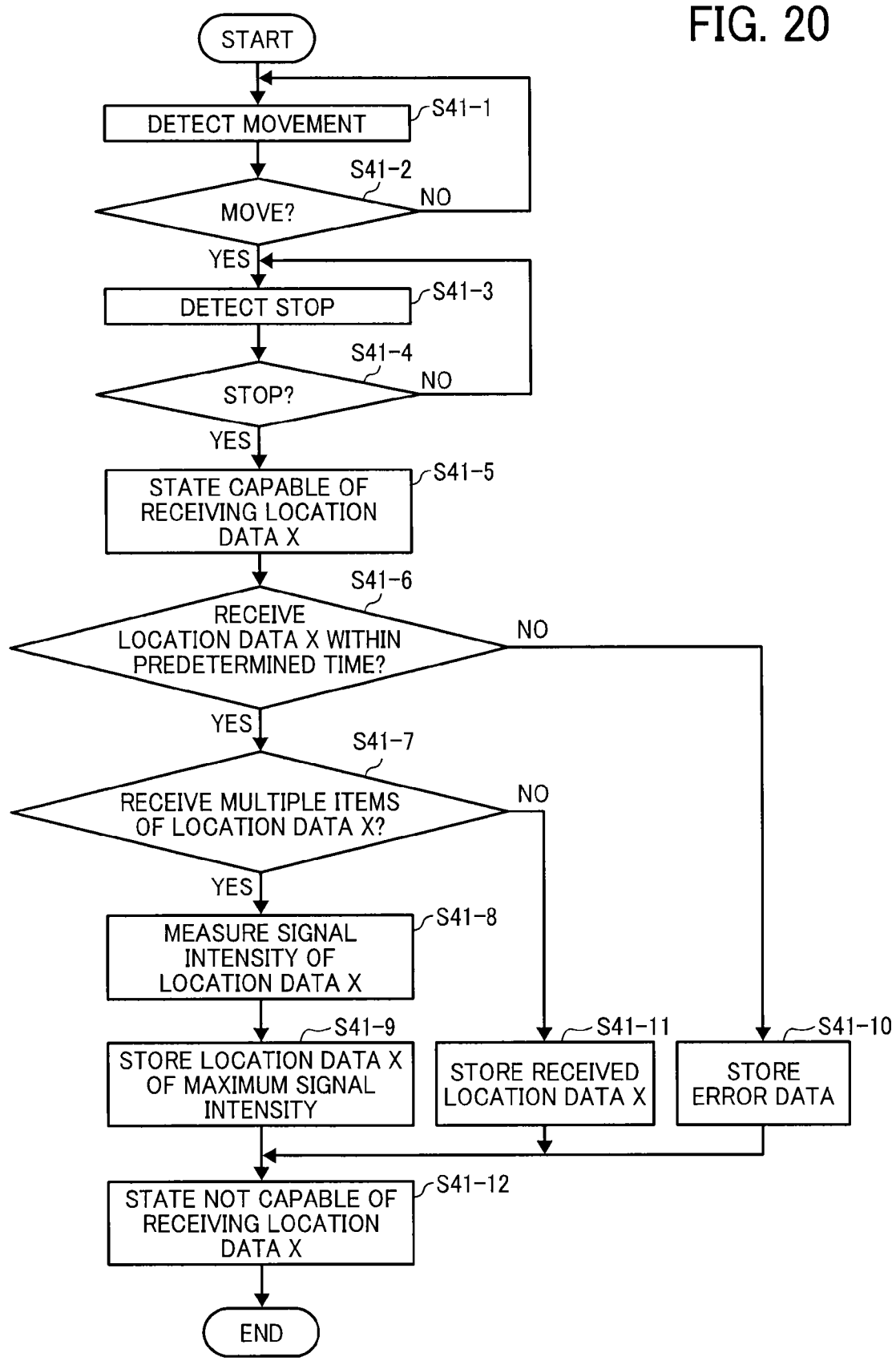
FIG. 20 is a flowchart illustrating operation of receiving location data and storing the location data, performed by the communication terminal, according to an example embodiment of the present invention.

Referring to FIG. 20, operation performed at S41 is explained in more detail. FIG. 20 is a flowchart illustrating operation of receiving the location data and storing the location data, performed by the communication terminal 5, according to an example embodiment of the present invention.

At S41-1, the detector 42 of the receiver controller 40 of the communication terminal 5 monitors to detect the change in movement of the communication terminal 5. At S41-2, the detector 42 determines whether the communication terminal 5 starts moving. When the detector 42 detects that the communication terminal 5 starts moving ("YES" at S41-2), the operation proceeds to S41-3. At S41-3, the detector 42 monitors to determine whether the communication terminal 5 stops moving.

More specifically, assuming that the CPU 401 (FIG. 7) is not performing operation of receiving location data X. When the acceleration sensor 405, which detects the change in acceleration, determines that the communication terminal 5 starts moving, the acceleration sensor 405 sends an activation signal to activate processing by the CPU 401, to the CPU 401. The CPU 401, which receives the activation signal, starts operation of receiving location data X. This operation state of the CPU 401 is kept, until the CPU 401 receives an inactivation signal indicating that the communication terminal 5 stops moving, from the acceleration sensor 405. Further, in this example, the acceleration sensor 405 detects the movement of the communication terminal 5, not only when the communication terminal 5 changes its location, but when the communication terminal 5 changes its position due to inclination.

At S41-4, when the detector 42 detects that the communication terminal 5 stops moving ("YES" at S41-4), the operation proceeds to S41-5. At S41-5, the receiver 41 is activated so as to receive the location data X, transmitted from the transmission device 3. More specifically, when the CPU 401 of FIG. 7 receives the inactivation signal indicating that the communication terminal 5 stops moving from the acceleration sensor 405, the CPU 401 transmits an activation signal that activates the communication circuit 404, to the communication circuit 404. The communication circuit 404 starts operation of receiving location data X.

For example, assuming that the location data Xa and the location data Xb are respectively transmitted from the transmission device 3a and the transmission device 3b, the communication circuit 404 of the controller 14 of the communication terminal 5 starts receiving the location data Xa and Xb via the antenna 404a.

At S41-6, the determiner 43 determines whether at least one item of location data X is received within a predetermined time period, such as 5 seconds, from the time at which the receiver 41 is activated to receive the location data X at S41-5. In this example, it is assumed that the communication terminal 5 receives two items of location data, that is, the location data Xa and the location data Xb, within the predetermined time period.

When the determiner 43 determines that at least one location data X is received ("YES" at S41-6), at S41-7, the determiner 43 determines whether the plurality of items of location data X is received from a plurality of transmission devices 3.

When it is determined that a plurality of items of location data X is received from the plurality of transmission devices 3 ("YES" at S41-7), at S41-8, the measuring device 44 measures a signal intensity of each one of the location data X, received at the receiver 41. In this example, it is assumed that the signal intensity of the location data Xa is greater than the signal intensity of the location data Xb.

At S41-9, the memory control 48 stores the location data X having the highest signal intensity, based on the measurement at S41-8, in the storage area 49. In this example, the location data Xa having the highest signal intensity is stored.

When the determiner 43 determines that at least one item of location data X is not received within the predetermined time period at S41-6 ("NO" at S41-6), at S41-10, the memory control 48 stores error information in the storage area 49, which indicates the occurrence of an error.

When the determiner 43 determines that the plurality of items of location data X is not received from the plurality of transmission devices 3 within the predetermined time period ("NO" at S41-7), at S41-11, the memory control 48 stores one item of location data X, which is received.

After performing S41-9, S41-10, or S41-11, at S41-12, the receiver 41 stops operation of receiving the location data, such that the communication terminal 5 stops receiving the location data X. More specifically, the CPU 401 of FIG. 7 sends an inactivation signal that inactivates the communication circuit 404, to the communication circuit 404.

As described above, the operation of receiving location data is performed only when the communication terminal 5 is moved from one location to another location. More specifically, the communication circuit 404 is activated to receive the location data, only when the communication terminal 5 stops moving, after the communication terminal 5 starts moving. This reduces electric power consumption of the communication terminal 5. Accordingly, even when the button battery 406 having relatively a small capacity is used, the button battery 406 does not have to be replaced many times.

In the above-described example, after the communication terminal 5 starts moving ("YES" at S41-2), and when the communication terminal 5 stops moving ("YES" at S41-4), at S41-5, the receiver 41 is activated so as to start receiving the location data X. That is, detecting starting of movement and stopping of movement together function as a trigger, which activates the receiver 41 to start receiving the location data X.

Alternatively, detection of starting of movement of the communication terminal 5 ("YES" at S41-2) alone may trigger activation of the receiver 41 to start receiving the location data X. In such case, S41-3 and S41-4 are not performed.

Alternatively, detection of stopping of movement of the communication terminal 5 ("YES" at S41-4) alone may trigger activation of the receiver 41 to start receiving the location data X.

Referring back to FIG. 19, at S42, the communicator 47 of the receiver controller 40 sends a request to the wireless communication controller 50, which instructs to start operation of preparing for communication ("participation operation"). The communicator 57 of the wireless communication controller 50, which receives the instruction to start, starts the following participation operation.

At S43, the memory control 58 of the wireless communication controller 50 of the communication terminal 5 reads out the terminal ID data A, assigned to the communication terminal 5, from the storage area 59. At S44, the data transmitter/receiver 51 sends a participation request including the terminal ID data A, to each one of the transmission devices 3a and 3b. The transmission devices 3a and 3b respectively receive the participation requests from the communication terminal 5.

At S45-1, the memory control 38 of the wireless communication controller 30 of the transmission device 3a reads out the device ID data Ba, assigned to the transmission device 3a, from the storage area 39.

At S46-1, the data transmitter/receiver 31 of the transmission device 3a sends a participation response including the terminal ID data A and the device ID data Ba, to the communication terminal 5. The data transmitter/receiver 51 of the wireless communication controller 50 of the communication terminal 5 receives the participation response. The communication terminal 5 is able to determine that the participation response received at S46-1 is transmitted in response to the participation request transmitted at S44, based on the terminal ID data A. Based on this determination, the communication terminal 5 determines that the participation response is successfully received in response to the participation request. At S47-1, the memory control 58 of the wireless communication controller 50 of the communication terminal 5 stores the device ID data Ba in the storage area 59.

In a substantially similar manner as described above referring to S45-1, at S45-2, the memory control 38 of the wireless communication controller 30 of the transmission device 3b reads out the device ID data Bb, assigned to the transmission device 3b, from the storage area 39.

At S46-2, the data transmitter/receiver 31 of the transmission device 3b sends a participation response including the terminal ID data A and the device ID data Bb, to the communication terminal 5. The data transmitter/receiver 51 of the wireless communication controller 50 of the communication terminal 5 receives the participation response. At S47-2, the memory control 58 of the wireless communication controller 50 of the communication terminal 5 stores the device ID data Bb in the storage area 59.

At S48, the wireless communication controller 50 determines a destination transmission device 3 to which the location data X, stored at S41, is transmitted with the terminal ID data A. The operation performed at S48 is explained in more detail, referring to FIG. 22.

Figure 21:
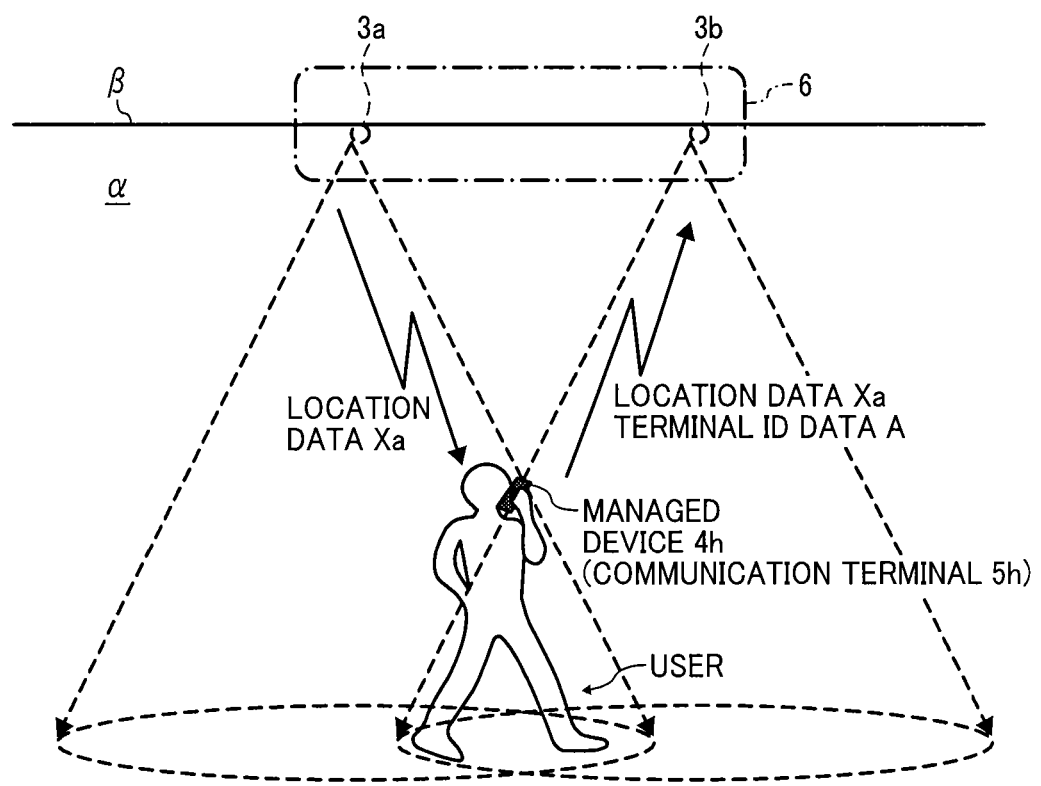
FIG. 21 is an illustration for explaining communication between the transmission system and the communication terminal.
Figure 22:
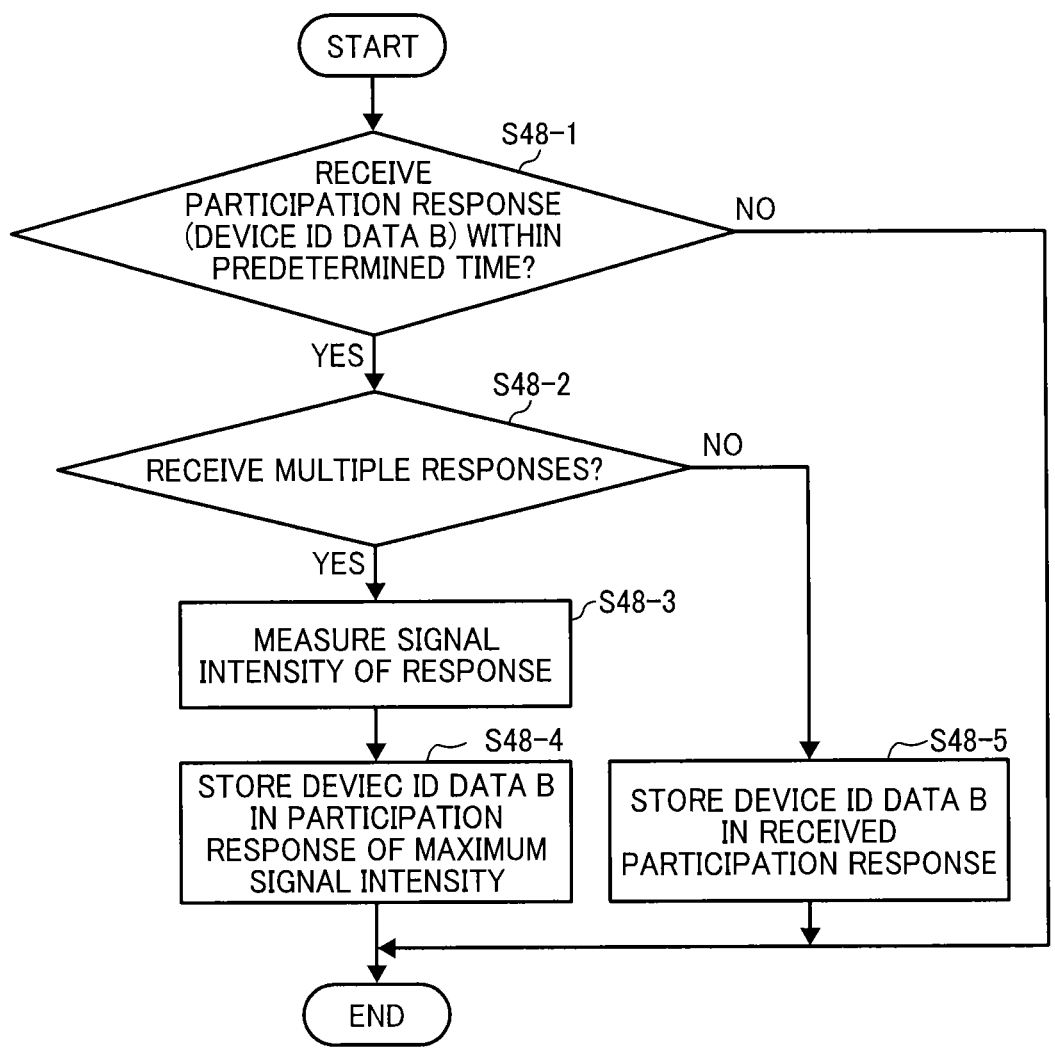
FIG. 22 is a flowchart illustrating operation of determining the destination transmission device, performed by the communication terminal, according to an example embodiment of the present invention.

Before explaining the operation referring to FIG. 22, example situations that may require to perform this operation are illustrated, with reference to FIGS. 5, 14, and 21. FIG. 21 illustrates example situations in which the communication terminal 5 transmits the location data Xa received from the transmission device 3a, to the destination transmission device 3b.

As illustrated in FIG. 14, the communication established between the transmission controller 20 of the transmission device 3 and the receiver controller 40 of the communication terminal 5, is independent from the communication established between the wireless communication controller 30 of the transmission device 3 and the wireless communication controller 50 of the communication terminal 5. More specifically, the receiver controller 40 of the communication terminal 5 receives the location data X from the transmission device 3, using a communication network between the transmission controller 20 and the receiver controller 40. The wireless communication controller 50 of the communication terminal 5 transmits the location data X with the terminal ID data A to the transmission device 3, using a communication network between the wireless communication controller 30 and the wireless communication controller 50. With this configuration, the location data X, received at the receiver controller 40, does not have to be the same as the location data X, transmitted by the wireless communication controller 50, even though the receiver controller 40 and the wireless communication controller 50 are incorporated in the communication terminal 5. That is, the transmission device 3 having the transmission controller 20 that transmits the location data X to the communication terminal 5 does not have to be the same as the transmission device 3 having the wireless communication controller 30 that receives the location data X from the communication terminal 5.

The inventors of the present invention have found that, with the above-described structural characteristics of the transmission device 3, the location management system 1 of FIG. 1 can be implemented with less cost and with lower electric power consumption. For example, as described below referring to FIGS. 21, 26 and 27, the transmission controller 20 and the wireless communication controller 30 do not have to be provided for all of the transmission devices 3 in the location management system 1. (See situation 1, below)

Further, with the above-described structural characteristics, the inventors of the present invention have found that reliability of the location management system increases, as the communication terminal 5 only needs to transmit the location data to one of the first and second transmission devices, even though the other transmission device may not work. (See situation 2, below)

Further, with the above-described structural characteristics, the inventors of the present invention have found that electric power consumption can be greatly reduced, as the communication terminal 5 can transmit the location data to one of the first and second transmission devices, with which the communication terminal 5 can communicate with less energy. (See situation 3, below)

Referring now to FIG. 21, the above-described example situations in which the location data Xa received from the transmission device 3a is to be transmitted to the transmission device 3b are described. As illustrated in FIG. 21, the communication terminal 5h (the managed device 4h) is located within an area, where the transmission area of the transmission device 3a and the transmission area of the transmission device 3b are overlapped with each other.

Figure 26:
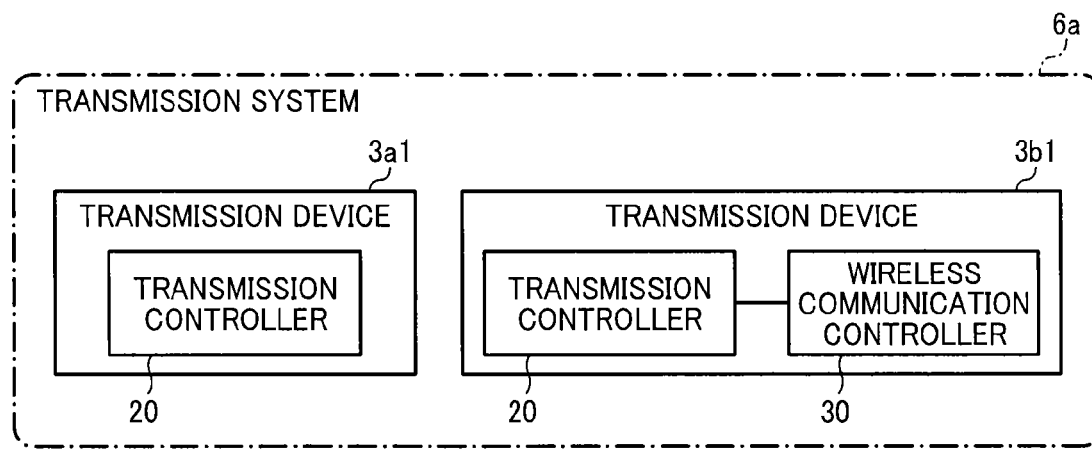
FIG. 26 is a schematic block diagram illustrating a transmission system including a first transmission device and a second transmission device, according to an example embodiment of the present invention.

In one example situation (situation 1), one of the transmission devices 3a and 3b that are located adjacent with each other, may not be provided with both of the transmission controller 20 and the wireless communication controller 30, for example, as illustrated in FIG. 26.

If the transmission controller 20 and the wireless communication controller 30 were both provided in each one of the transmission devices 3a and 3b, the number of transmission devices 3 tends to increase. Especially when the floor area indoors α is large, a large number of transmission devices 3 are required on the ceiling to cover the entire floor area, thus increasing the total installation cost. In order to reduce the total installation cost, in one example, every other transmission device 3 may not be provided with both of the transmission controller 20 and the wireless communication controller 30.

In one example, assuming that the transmission controllers 20 are provided for the transmission device 3a and the transmission device 3b, but the wireless communication controller 30 is provided only in the transmission device 3b, the communication controller 5, which receives the location data Xa and the location data Xb at the receiver controller 40, only transmits the location data Xa or Xb from the wireless communication controller 50 to the wireless communication controller 30 of the transmission device 3b, as the wireless communication controller 30 of the transmission device 3b is only available for communication with the wireless communication controller 50 of the communication terminal 5.

Figure 27:
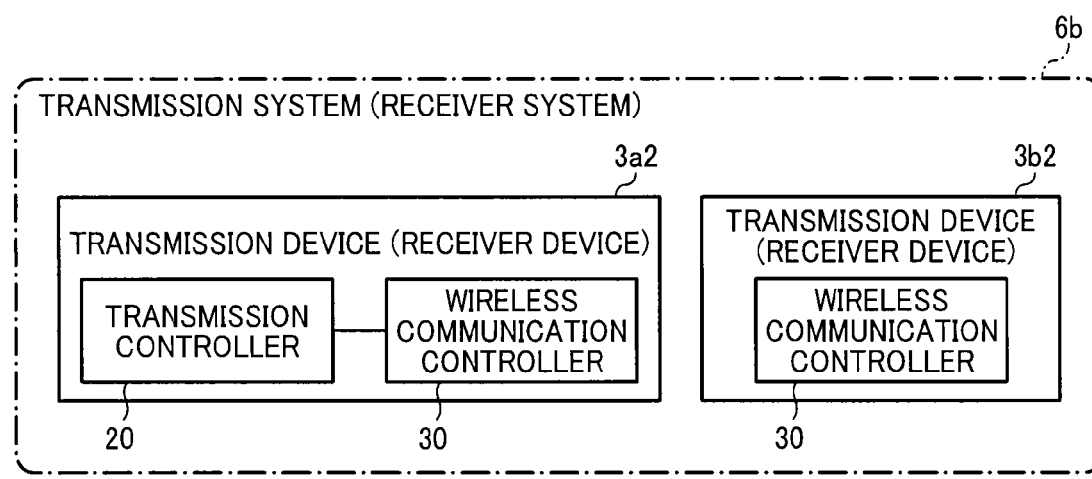
FIG. 27 is a schematic block diagram illustrating a transmission (receiver) system including a first receiver device and a second receiver device, according to an example embodiment of the present invention.

In another example situation (situation 2), due to the failure such as a machine trouble or a network trouble, the wireless communication controller 30 of the transmission device 3a may not be able to receive the terminal ID data A and the location data Xa from the communication terminal 5. In such case, the communication terminal 5 sends the location data Xa received from the transmission device 3a, to the transmission device 3b, as the wireless communication controller 30 of the transmission device 3b is only available for communication with the wireless communication controller 50 of the communication terminal 5. Under the situation 2, it is assumed that the transmission device 3a and the transmission device 3b are each provided with the wireless communication controller 30, for example, as illustrated in FIG. 27 or FIG. 19.

In another example situation (situation 3), it is assumed that the location data Xa received from the transmission controller 20 of the transmission device 3a (S24-1) has a signal intensity higher than a signal intensity of the location data Xb received from the transmission controller 20 of the transmission device 3b (S24-2). In such case, the location data Xa having the highest signal intensity is selected. However, depending on the location of the communication terminal 5 indoors α, the participation response data (signal) received from the wireless communication controller 30 of the transmission device 3b (S46-2) may have a signal intensity higher than the signal intensity of the participation response data (signal) received from the wireless communication controller 30 of the transmission device 3a (S46-1). In such case, it would be more reliable to send the location data Xa to the wireless communication controller 30 of the transmission device 3b. Further, electric power required for data transmission may be reduced. Under the situation 3, any one of the transmission systems 6 of FIGS. 19, 26, and 27 may apply.

In any one of the above-described example situations, as illustrated in FIG. 21, the communication terminal 5h stores the location data Xa received from the transmission device 3a. The communication terminal 5h further transmits the terminal ID data A and the location data Xa, to the transmission device 3b that is different from the transmission device 3a from which the location data Xa is received.

Referring now to FIGS. 14 and 22, operation of determining the destination transmission device is explained, which may be performed in any one of the above-described situations.

At S48-1, the determiner 53 of the wireless communication controller 50 of the communication terminal 5 of FIG. 14 determines whether the data transmitter/receiver 51 receives at least one participation response within a predetermined time period, such as five seconds, from the time at which the data transmitter/receiver 51 sends a participation request to the transmission devices 3a and 3b at S44. More specifically, in this example, the determiner 53 determines whether at least one item of device ID data B is received, within the predetermined time period from the time at which the terminal ID data A is transmitted.

When the determiner 53 determines that at least one participation response is received ("YES" at S48-1), at S48-2, the determiner 53 determines whether a plurality of participation responses is received. More specifically, the determiner 53 determines whether a plurality of items of device ID data B is received within the predetermined time period, from the time at which the terminal ID data A is transmitted.

When the determiner 53 determines that a plurality of participation responses is received at S48-2 ("YES" at S48-2), at S48-3, the measuring device 54 measures the signal intensity of each one of the participation responses, which are received at the data transmitter/receiver 51. In this example, the wireless communication controller 50 of the communication terminal 5 receives the participation responses respectively from the transmission devices 3a and 3b at S46-1 and S46-2. Accordingly, the operation proceeds to S48-3.

In the following, it is assumed that the signal intensity of the participation response from the transmission device 3b is higher than the signal intensity of the participation response from the transmission device 3a, based on the measurement result at S48-3.

At S48-4, based on the measurement result at S48-3, the memory control 58 stores the device ID data Bb (the device ID data B) having the highest signal intensity, in the storage area 59.

At S48-1, when the determiner 53 determines that at least one participation response is not received, that is, no participation response is received, within the predetermined time period ("NO" at S48-1), the operation of determining the destination transmission device 3 ends in error.

At S48-2, when the determiner 53 determines that a plurality of participation responses is not received, that is, only one participation response is received ("NO" at S48-2), at S48-5, the memory control 58 stores the device ID data B, which is included in the participation response that is received, in the storage area 59.

As described above, the transmission device 3 (the wireless communication controller 30) identified by the device ID data B, which is stored in the storage area 59 via the memory control 58 at S48-4 or S48-5, is determined to be a destination transmission device 3 (a destination wireless communication controller 30) to which the location data X and the terminal ID data A are transmitted from the communication terminal 5.

After performing S48-4 or S48-5, the operation proceeds to S49 of FIG. 19. At S49, the data transmitter/receiver 51 of the wireless communication controller 50 generates data having a data structure of FIG. 9, using information regarding the destination transmission device 3 determined at S48. For example, the data includes the device ID data Bb of the transmission device 3b as a destination field, the terminal ID data Ah of the communication terminal 5h as a sender field, and the contents of data such as the location data Xa of the transmission device 3a that sends the location data Xa, which are sequentially arranged.

At S50, the data transmitter/receiver 51 sends the data having the data structure, which is generated at S49, to the transmission device 3b. The wireless communication controller 30 of the transmission device 3b receives the data transmitted from the communication terminal 5.

At S51, the communication terminal 5 stops operation of the data transmitter/receiver 51, the determiner 53, the measuring device 54, the communicator 57, and the memory control 58, of the wireless communication controller 50. More specifically, as the data transmitter/receiver 51 completes sending the data such as the location data X to the transmission device 3, at least a selected part of the wireless communication controller 50 may be inactivated. This reduces electric power consumption. The part of the wireless communication controller 50, which is inactivated, may be activated in response to a request for starting operation from the receiver controller 40, as described above referring to S42.

Figure 23:
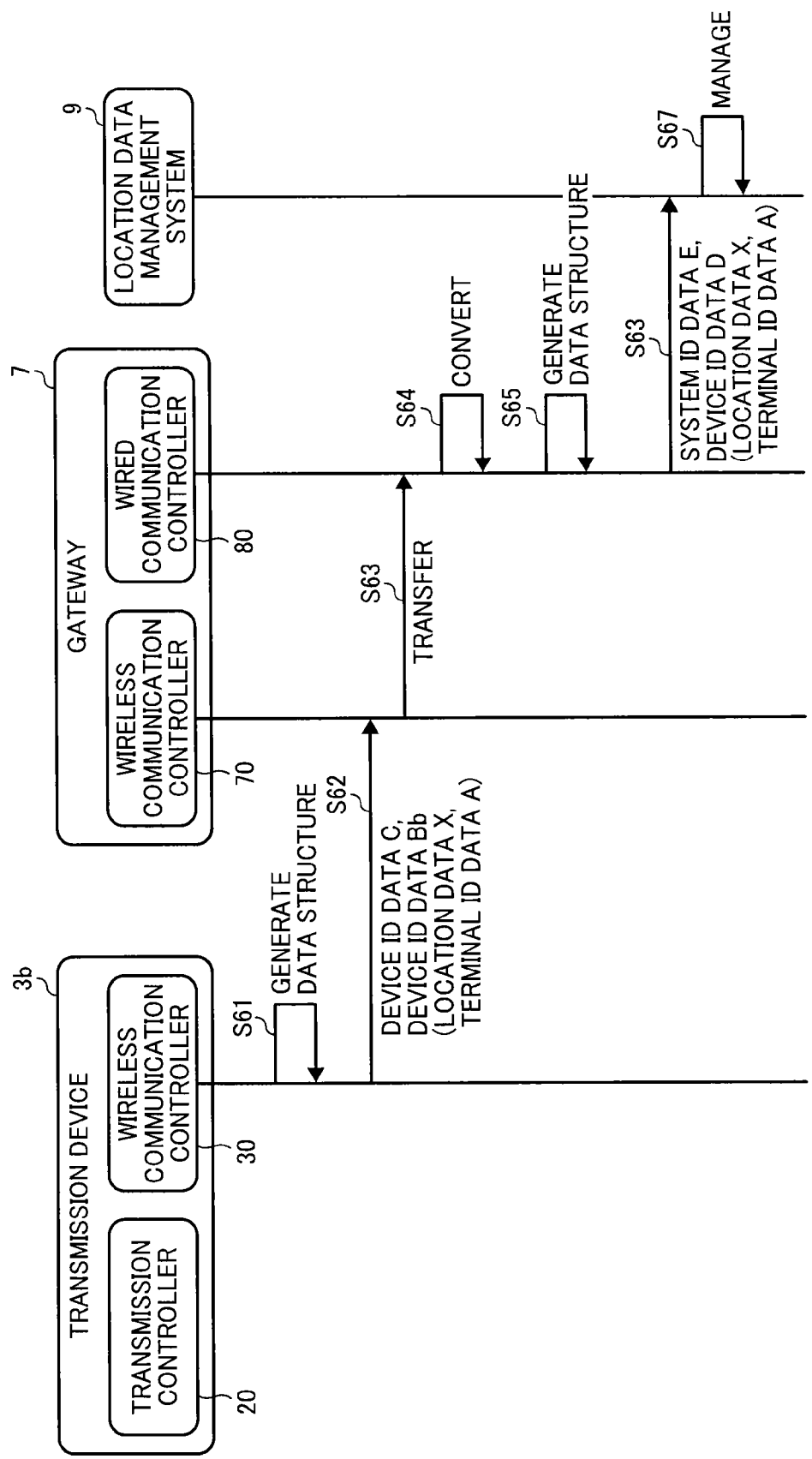
FIG. 23 is a data sequence diagram illustrating operation of managing location data, using the location management system of FIG. 1, according to an example embodiment of the present invention.

Referring now to FIG. 23, operation of managing the data including the location data X, received from the transmission device 3 via the gateway 7, as the management data F at the location data management system 9, is explained according to an example embodiment of the present invention. FIG. 23 illustrates a data sequence diagram illustrating operation of managing the location data X.

As illustrated in FIG. 23, at S61, the wireless communication controller 30 of the transmission device 3b generates data having a specific data structure, to be sent to the gateway 7, in a substantially similar manner as described above referring to S49 of FIG. 19. Referring to FIG. 9, the data includes the device ID data C of the gateway 7 as a destination field, the device ID data Bb of the transmission device 3b as a sender field, and the contents of data such as the location data Xa of the transmission device 3a and the device ID data A of the communication terminal 5, which are sequentially arranged.

At S62, the data transmitter/receiver 31 of the wireless communication controller 30 of the transmission device 3b sends the data having the data structure, which is generated at S61, to the gateway 7. The data transmitter/receiver 71 of the wireless communication controller 70 of the gateway 7 receives the data transmitted from the transmission device 3b.

At S63, the communicator 77 of the wireless communication controller 70 transfers the data received at S62, to the communicator 87 of the wired communication controller 80 of the gateway 7. The wired communication controller 80 receives the data transferred from the wireless communication controller 70. At S64, the converter 82 of the wired communication controller 80 converts the communication protocol in compliance with the IEEE802.15.4, to the communication protocol in compliance with the IEEE 802.3, such that the data received from the transmission device 3b can be transmitted in the form of a packet in compliance with the Ethernet.

At S65, the data transmitter/receiver 81 of the wired communication controller 80 generates data having a data structure, which is to be transmitted to the location data management system 9, in a substantially similar manner as described above referring to S61. Referring to FIG. 9, the data includes the system ID data E of the location data management system 9 as a destination field, the device ID data D of the gateway as a sender field, and the contents of data such as the location data Xa of the transmission device 3a and the terminal ID data A of the communication terminal 5, which are sequentially arranged.

At S66, the data transmitter/receiver 81 of the wired communication controller 80 of the gateway 7 sends the data having the data structure, which is generated at S65, to the location data management system 9. The data transmitter/receiver 91 of the location data management system 9 receives the data transmitted from the gateway 7.

At S67, the memory control 98 of the location data management system 9 manages the location data X. More specifically, the memory control 98 of the location data management system 9 stores the location data Xa and the received date/time at which the data such as the location data X is received, in association with the terminal ID data A stored in the storage area 99, to manage the stored data as the management data F as illustrated in FIG. 13.

Figure 24:
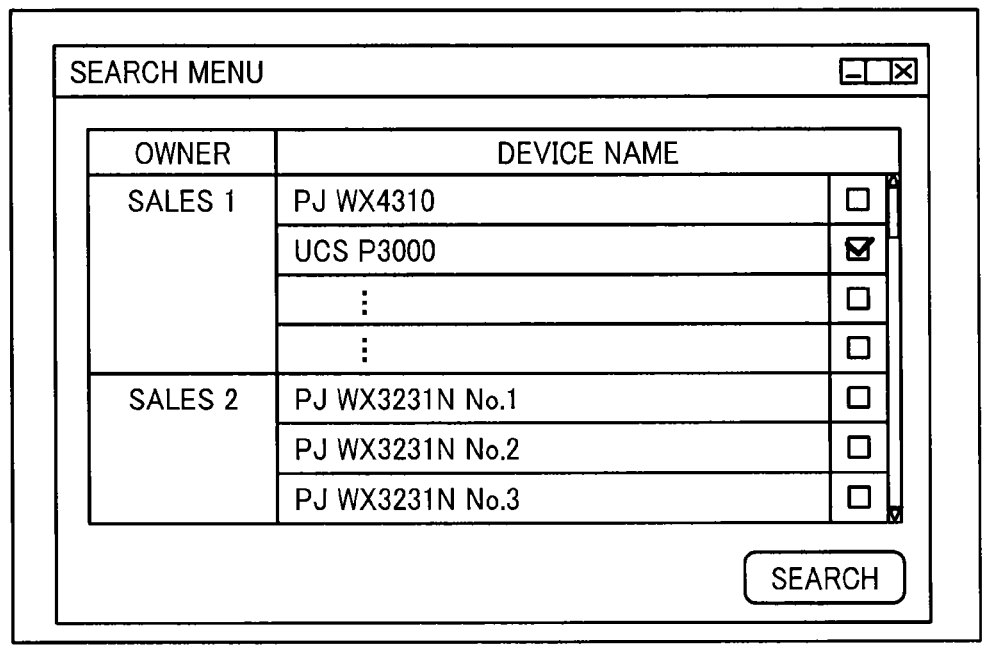
FIG. 24 is an illustration of an example screen, displayed by the location data management system.

As described above, through managing the management data F using the location data management system 9, a user, such as an administrator, of the location data management system 9 is able to search for the communication terminal 5 (the managed device 4) as described below referring to FIGS. 24 and 25. FIGS. 24 and 25 are example screens displayed by the location data management system 9.

In one example, the operation input 92 may receive a user input through user operation performed on the keyboard 911 or the mouse 912 of FIG. 12. The display control 94 reads out the management data F via the memory control 98, and causes the display 908 to display a search screen as illustrated in FIG. 24. The search screen of FIG. 24 includes a list of a plurality of managed devices 4 owned by each owner (administrator), which is managed by the location data management system 9. For each owner name, the device name of each one of the communication terminals 5 (the managed devices 4) is listed. The search screen of FIG. 24 further displays thereon a checkbox at the right of each device name being displayed. The search screen of FIG. 24 further displays thereon a "SEARCH" key, which allows the user to instruct the location data management system 9 to search for a specific managed device (communication terminal).

To obtain information regarding the current location of a target managed device 4 (communication terminal 5), the user checks the checkbox associated with the device name of the target managed device 4, using the keyboard 911 or the mouse 912. The operation input 92 receives a user input for selecting the checkbox. Assuming that the user checks the checkbox for each one of the device names of the target devices 4 that the user desires to have information, the user selects the "SEARCH" key. The operation input 92 receives the search request for searching the checked device 4. The search device 93 searches the management data F, stored in the storage area 99, based on the checked device name, to obtain at least a part of the management data F having the location data X of the checked device, and the layout data G showing a floor including the current location identified by the location data X. The display control 94 displays a search result screen of FIG. 25 on the display 908, based on the management data F and the layout data G.

In this example screen of FIG. 24, the checkbox is marked for the managed device 4 having the device name "UCS P3000", which is owned by the user "Sales group 1", as a target device 4 subjected for search. In response to selection on the "SEARCH" key, the search device 93 searches the management data F, using the device name "UCS P3000", to obtain at least the location data X of the target device "UCS P3000", and the layout data G relating to the location data X of the target device "UCS P3000". The display control 94 causes the display 908 to display the search result screen of FIG. 25, based on the obtained information.

More specifically, in this example, the location data management system 9 refers to the management data of FIG. 13 to obtain a record for the device name "UCS P3000", which includes the location data X such as the floor "4" and the building number "A", the received date/time, etc. Using the location data X, the location data management system 9 further obtains the layout data G. Based on the obtained information, the display 908 displays the layout of the floor "Building A, 4th floor" at which the device "UCS P3000" is located, and various data from the management data F such as the location data X (shown by the square indicated by the arrow) and the received date/time. In this example, with the received date/time, the user is able to know that the device "UCS P3000" is located at that location, at the date/time being displayed. With this information, the administrator is able to instantly recognize the current location of the managed device 4 (the communication terminal 5).

As described above, in one embodiment, in the location management system 1 capable of detecting the current location of a communication terminal 5, at least a first transmission device 3 and a second transmission device 3 are provided at locations that are adjacent to each other or closely located to each other, to form a transmission system capable of transmitting first location data from the first transmission device 3 and second location data from the second transmission device 3.

In one example, the first transmission device 3 and the second transmission device 3 are each provided with a transmitter (the transmitter 21), for example, in the transmission controller 20. At least one of the first transmission device 3 or the second transmission device 3 is further provided with a receiver (the data transmitter/receiver 31), for example, in the wireless communication controller 30. For example, the second transmission device 3 is further provided with the receiver.

Accordingly, in the transmission system, the second transmission device 3 also transmits the second location data indicating the location at which the second transmission device 3 is located. As long as the communication terminal 5 is located within the transmission range of the second transmission device 3, the communication terminal 5 can receive the second location data, even though the communication terminal 5 is located within the transmission range of the first transmission device 3. In such case, the communication terminal 5 may transmit the first location data or the second location data to the second transmission device 3, as long as the communication terminal 5 is located within the transmission range of the second transmission device 3. This reduces electric power consumption, which is required by the communication terminal 5 to transmit or receive data.

Further, in the above-described transmission system, the second transmission device 3, which is capable of transmitting the second location data and receiving the second location data from the communication terminal 5, is able to receive the first location data from the communication terminal 5 in place of the first transmission device 3. For example, the first transmission device 3 may not be capable of receiving the location data, as the receiver is not provided. Accordingly, the location data can be managed, even with the transmission system having a simplified structure.

In such case, the communication terminal 5 sends the first location data to the second transmission device 3, instead of sending the first location data to the first transmission device 3 that transmits the first location data.

In another example, the first transmission device 3 and the second transmission device 3 are each provided with a transmitter (the transmitter 21) in the transmission controller 20, and a receiver (the data transmitter/receiver 31) in the wireless communication controller 30. Even in such case, the first transmission device 3 may not be able to receive the location data, for example, due to an error. The communication terminal 5 sends the first location data to the second transmission device 3, instead of sending the first location data to the first transmission device 3 that transmits the first location data.

As described above, in one embodiment, in the location management system 1 capable of detecting the current location of a communication terminal 5, at least a first transmission (receiver) device 3 and a second transmission (receiver) device 3 are provided at locations that are adjacent to each other or closely located to each other, to form a transmission (receiver) system capable of receiving one of first location data or second location data from the communication terminal 5.

In one example, the first transmission (receiver) device 3 and the second transmission (receiver) device 3 are each provided with a receiver (the data transmitter/receiver 31), for example, in the wireless communication controller 30. At least one of the first transmission (receiver) device 3 or the second transmission (receiver) device 3 is further provided with a transmitter (the transmitter 21), for example, in the transmission controller 20. For example, the first transmission (receiver) device 3 is further provided with the transmitter.

Accordingly, in the transmission (receiver) system, the first transmission (receiver) device 3 capable of receiving the location data, also transmits the first location data indicating the location at which the first transmission (receiver) device 3 is located. As long as the communication terminal 5 is located within the transmission range of the first transmission (receiver) device 3, the communication terminal 5 can receive the first location data, and transmit the first location data to the second transmission (receiver) device 3 even though the second transmission (receiver) device 3 is not provided with the transmitter 21. This reduces electric power consumption, which is required by the communication terminal 5 to receive or transmit data.

Further, in the above-described receiver system, the second transmission (receiver) device 3 is able to receive the first location data from the communication terminal 5, in place of the first transmission (receiver) device 3 capable of transmitting the first location data and receiving the first location data from the communication terminal 5. For example, the first transmission (receiver) device 3 may not be capable of transmitting the location data, as the transmitter is not provided. Accordingly, the location data can be managed, even with the transmission (receiver) system having a simplified structure.

In such case, the communication terminal 5 sends the first location data to the second transmission (receiver) device 3, instead of sending the first location data to the first transmission (receiver) device 3 that transmits the first location data.

In another example, the first transmission device 3 and the second transmission device 3 are each provided with a transmitter (the transmitter 21) in the transmission controller 20, and a receiver (the data transmitter/receiver 31) in the wireless communication controller 30. Even in such case, the second transmission (receiver) device 3 may not be able to transmit the location data, for example, due to an error. The communication terminal 5 sends the first location data to the second transmission device 3, instead of sending the first location data to the first transmission device 3 that transmits the first location data, as long as the second transmission device 3 is capable of receiving the location data.

As described above, in one embodiment, in the location management system 1 capable of detecting the current location of a communication terminal 5, a communication terminal is provided to communicate with a transmission (receiver) system including at least a first transmission (receiver) device 3 and a second transmission (receiver) device 3.

In one example, the communication terminal includes a receiver that receives first location data from the first transmission (receiver) device 3, and a transmitter that transmits the first location data and terminal identification data that identifies the communication terminal, to the second transmission device that is different than the first transmission device from which the first location data is received.

In one example, the communication terminal 5 may receive the first location data and the second location data, respectively, from the first transmission device 3 and the second transmission device 3. In such case, the communication terminal 5 selects one of the first location data and the second location data. With this configuration, even when more than one location data is received, the communication terminal 5 is able to determine one location data for transmission. This reduces electric power consumption by the communication terminal 5, thus saving energy.

In one example, the communication terminal 5 determines a destination transmission device to which the location data is transmitted, for example, based on comparison in signal intensity between a signal received from the first transmission device and a signal received from the second transmission device. With this configuration, even when there is more than one transmission device available for communication, the communication terminal 5 is able to determine one transmission device for transmission. This reduces electric power consumption by the communication terminal 5, thus saving energy.

Further, in one example, operation of receiving the location data X starts, only when starting of movement of the communication terminal 5 and stopping of movement of the communication terminal 5 are detected. This further reduces electric power consumption by the communication terminal 5, thus saving energy.

Further, after the data transmitter/receiver 51 completes transmission of data such as the location data X to the transmission device 3, at least a part of the wireless communication controller 50 is inactivated to stop processing. This further reduces electric power consumption by the communication terminal 5.

As electric power consumption is reduced, even when a battery having a relatively small capacity, such as the button battery 406, is used, the battery does not have to be replaced so many times. This further reduces the work load of a user.

As described above referring to FIG. 21, in the situation 1, the second transmission device 3b is able to receive the location data Xa and the terminal ID data A from the communication terminal 5, in place of the first transmission device 3a. This suppresses the installation cost of the transmission device 3, as the first transmission device 3a does not have to be provided with the wireless communication controller 30, or the second transmission device 3b does not have to be provided with the transmission controller 20.

Further, in the situation 2, even though the wireless communication controller 30 of the first transmission device 3a does not operate, the second transmission device 3b of the transmission system is able to obtain the location data Xa and the terminal ID data A from the communication terminal 5. In a substantially similar manner, even through the transmission controller 20 of the second transmission device 3b does not operate, the second transmission device 3b of the transmission system is able to obtain the location data Xa and the terminal ID data A from the communication terminal 5.

Further, in the situation 3, the communication terminal 5 is able to transmit the location data X and the terminal ID data A to the transmission device 3, which is capable of communicating the signal having a higher signal intensity. The transmission system 6 is able to receive the location data X and the terminal ID data A from the communication terminal 5, with improved reliability.

The location data management system 9 may be implemented by a single computer. Alternatively, any number of parts, functions, modules, or storage areas of the location data management system 9 may be classified into a desired number of groups to be carried out by a plurality of computers.

A recording medium storing any one of the control program, or a storage device such as a hard disk that stores the program, may be distributed within the country or to another country as a computer program product. For example, as described above, the communication terminal 5 may be additionally provided with the function of communicating with the transmission system including at least the first transmission device and the second transmission device, by firmware modification or upgrade. Further, the transmission device 3 is provided with a control program that controls operation of the transmission device 3.

Examples of the transmission system 6 include a transmission system 6a of FIG. 26, which includes a first transmission device 3a1 having the transmission controller 20, and a second transmission device 3b1 having the transmission controller 20 and the wireless communication controller 30.

In one example, the wireless communication controller 30 of the first transmission device 3a1 is not provided within the first transmission device 3a1, as described above referring to the situation 1.

In another example, the wireless communication controller 30 of the first transmission device 3a1 is provided within the transmission device 3a1, but may not work due to failure such as a machine trouble, as described above referring to the situation 2.

In another example, even though the signal intensity of the location data X received from the first transmission device 3a1 is higher than the signal intensity of the location data X received from the second transmission device 3b1, the signal intensity of the participation response received from the second transmission device 3b1 may be higher than the signal intensity of the participation response received from the first transmission device 3a1, as described above referring to the situation 3.

In FIG. 26, since the wireless communication controller 30 is not provided in the first transmission device 3a1, the participation response received from the first transmission terminal 3a1 received at the communication terminal 5 has the signal intensity of zero. Accordingly, the participation response received from the second transmission device 3b1, received at the communication terminal 5, has the data signal intensity higher than that of the participation response received from the first transmission terminal 3a1.

In any one of the above-described situations 1, 2, and 3, while the second transmission device 3b1 is capable of transmitting the location data Xb and receiving the location data Xb from the communication terminal 5, the second transmission device 3b1 receives the location data Xa assigned to the first transmission device 3a1.

Alternatively, the transmission system 6 may have a structure as illustrated in FIG. 27. The transmission system 6b of FIG. 27 includes a first transmission device 3a2 having the transmission controller 20 and the wireless communication controller 30, and a second transmission device 3b2 having the wireless communication controller 30.

In one example, the transmission controller 20 is not provided in the second transmission (receiver) device 3b2, as described above referring to the situation 1.

In one example, the wireless communication controller 30 is provided in the first transmission device 3a2, but may not work due to failure such as a machine trouble, as described above referring to the situation 2.

In another example, even though the signal intensity of the location data X received from the first transmission device 3a2 is higher than the signal intensity of the location data X received from the second transmission device 3b2, the signal intensity of the participation response received from the second transmission device 3b2 may be higher than the signal intensity of the participation response received from the first transmission device 3a2, as described above referring to the situation 3.

In any one of the above-described situations 1, 2 and 3, while the first transmission device 3a2 is capable of transmitting the location data Xa, and receiving the location data Xa and the terminal ID data A from the communication terminal 5, the second transmission device 3b2 receives the location data Xa assigned to the first transmission device 3a2.

In this example, the transmission devices 3a2 and 3b2 may each function as the receiver that receives the location data Xa and the terminal ID data A from the communication terminal 5. In such case, the transmission system 6b functions as the receiver system.

Further, at least one of the transmission devices 3a1, 3b1, 3a2, and 3b2 of FIGS. 26 and 27 may be provided with the converter 14 of FIG. 14, which converts electrical voltage to a driving force that drives the at least one of the transmission devices 3a1, 3b1, 3a2, and 3b2.

Further, in the communication terminal 5, the receiver 41 of the receiver controller 40 may be implemented by the data transmitter/receiver 51. In the managed device 4 (communication terminal 5), the receiver 61 may be implemented by the data transmitter/receiver 65. That is, the signal (data) may be received at the receiver, or the data transmitter/receiver.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A transmission system, comprising:
a first transmission device including a first transmitting circuit configured to transmit first location data to a communication terminal, the first location data indicating a location at which the first transmission device is located; and
a second transmission device different from the first transmission device, the second transmission device including:
a second transmitting circuit configured to transmit second location data indicating a location at which the second transmission device is located, and
a communication circuit communicably connected to the second transmitting circuit via a bus, the communication circuit configured to receive the first location data and terminal identification data from the communication terminal, the terminal identification data identifying the communication terminal.

2. The transmission system of claim 1, wherein
the first transmission device further includes a second communication circuit configured to receive the first location data and the terminal identification data from the communication terminal that receives at least the first location data.

3. The transmission system of claim 1, wherein the first transmission device further includes a memory configured to store the first location data.

4. The transmission system of claim 3, wherein the first transmission device is further configured to receive the first location data from the outside of the transmission system.

5. The transmission system of claim 1, wherein the communication circuit of the second transmission device is further configured to transmit the first location data and the terminal identification data to a location data management system, the location data management system managing location data via a communication network.

6. The transmission system of claim 1, wherein the first transmitting circuit transmits the first location data in a first signal via a communication protocol in compliance with the Indoor Messaging System, and the communication circuit receives a second signal that includes the first location data and the terminal identification data via a communication protocol in compliance with at least a physical layer of the IEEE 802.15.4.

7. The transmission system of claim 6, wherein the first transmitting circuit transmits the first signal via a first wireless communication network established with the communication terminal, and the communication circuit receives the second signal via a second wireless communication network established with the communication terminal.

8. The transmission system of claim 1, wherein the first transmission device and the second transmission device are respectively incorporated in separate electrical devices.

9. A location management system, comprising:
the transmission system of claim 1; and
the communication terminal, the communication terminal including:
   a second communication circuit configured to receive at least the first location data from the transmission system; and
   a third transmitting circuit configured to transmit the first location data and the terminal identification data to the transmission system.

10. A location management system, comprising:
the transmission system of claim 1; and
a location data management system configured to store the first location data in association with the terminal identification data.

11. A transmission system, comprising:
a first transmission device including a first transmitter that transmits first location data to a communication terminal, the first location data indicating a location at which the first transmission device is located; and
a second transmission device different from the first transmission device, the second transmission device including:
   a second transmitter that transmits second location data indicating a location at which the second transmission device is located, and
   a receiver that is communicably connected to the second transmitter via a bus, the receiver receives the first location data and terminal identification data from the communication terminal, the terminal identification data identifying the communication terminal.

12. The transmission system of claim 11, wherein the first transmission device further includes a storage area configured to store the first location data.

13. The transmission system of claim 12, wherein the first transmission device further includes a second receiver that receives the first location data from the outside of the transmission system, and
the storage area stores the first location data received by the second receiver of the first transmission device.

14. The transmission system of claim 11, wherein at least one of the first transmission device or the second transmission device includes a converter that converts electrical voltage supplied from an outside power source to a driving force that drives the at least one of the first transmission device or the second transmission device.

15. The transmission system of claim 11, wherein the second transmitter is further configured to transmit the first location data and the terminal identification data to a location data management system, the location data management system managing location data via a communication network.

16. The transmission system of claim 11, wherein the first transmitter transmits the first location data in a first signal via a communication protocol in compliance with the Indoor Messaging System, and
the receiver receives a second signal that includes the first location data and the terminal identification data via a communication protocol in compliance with at least a physical layer of the IEEE 802.15.4.

17. A location management system, comprising:
the transmission system of claim 11; and
a location data management system configured to store the first location data in association with the terminal identification data.

18. A method of transmitting location data, comprising:
transmitting, by a first transmission device, first location data to a communication terminal, the first location data indicating a location at which the first transmission device is located;
transmitting, by a transmitting circuit of a second transmission device different from the first transmission device, second location data indicating a location at which the second transmission device is located; and
receiving, by a communication circuit of the second transmission device, the communication circuit being communicably connected to the transmitting circuit via a bus, the first location data and terminal identification data from the communication terminal, the terminal identification data identifying the communication terminal.

* * * * *